United States Patent [19]
Shimizu

[11] Patent Number: 6,163,742
[45] Date of Patent: Dec. 19, 2000

[54] VEHICLE VELOCITY DETECTING DEVICE

[75] Inventor: Kouichi Shimizu, Kanagawa-ken, Japan

[73] Assignee: Nissan Motor Co., Ltd., Yokohama, Japan

[21] Appl. No.: 09/346,302

[22] Filed: Jul. 2, 1999

[30] Foreign Application Priority Data

Jul. 2, 1998 [JP] Japan .................................. 10-187332

[51] Int. Cl.$^7$ .............................. B60R 16/00; G01P 11/00
[52] U.S. Cl. ................................. 701/1; 701/74; 701/75; 702/56; 702/148; 180/197
[58] Field of Search ................................. 701/1, 70, 71, 701/72, 74, 75, 76; 180/197; 303/159; 702/145, 146, 148, 56

[56] References Cited

U.S. PATENT DOCUMENTS

| | | | |
|---|---|---|---|
| 3,874,741 | 4/1975 | Schnaibel et al. | 303/159 |
| 4,468,740 | 8/1984 | Beck et al. | 701/76 |
| 4,497,026 | 1/1985 | Braschel et al. | 701/76 |
| 4,670,852 | 6/1987 | Masaki et al. | 701/76 |
| 4,982,806 | 1/1991 | Yoshizawa et al. | 701/75 |
| 5,099,443 | 3/1992 | Higashimata et al. | 701/76 |
| 5,185,702 | 2/1993 | Okubo | 701/75 |
| 5,748,503 | 5/1998 | Saeki et al. | 701/74 |
| 5,819,193 | 10/1998 | Burgdorf et al. | 701/75 |

FOREIGN PATENT DOCUMENTS 9-272421  10/1997  Japan .

*Primary Examiner*—Gary Chin
*Attorney, Agent, or Firm*—Foley & Lardner

[57] ABSTRACT

A vehicle velocity detecting device is provided for detecting vehicle velocity of a vehicle. In the device, an average of driving wheels' speeds $Vw_{Dave}$ and an acceleration/deceleration $V'w_i$ of each wheel are calculated. When the average $Vw_{Dave}$ is less than a designated high wheel speed $Vw_{Hi}$ of 20 km/h or so and at least one of driving wheels' acceleration/deceleration $V'w_{DL}$ and $V'w_{DR}$ is more than a designated low-frequency noise value $V'w_{LO}$ of 1G or so, the third wheel speed $Vw_{3rd}$ from the largest wheel speed is set as the vehicle velocity $V_{SP}$. When three or more acceleration/deceleration $V'w_i$ are together more than a designated high-frequency noise value $V'w_{Hi}$ of 5G or so, the wheel speed detected in the past is set as the vehicle velocity $V_{SP}$. In either case, the vehicle velocity detecting method by the device is not withdrawn unless the wheel speed $Vw_i$ is less than a designated high wheel speed $Vw_{LO}$ or unless the average $Vw_{Dave}$ is more than the designated high wheel speed $Vw_{Hi}$ and the acceleration/deceleration $V'w_i$ is less than the designated high-frequency noise value $V'w_{Hi}$.

3 Claims, 9 Drawing Sheets

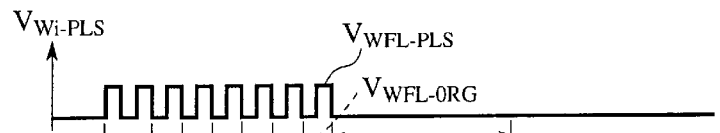
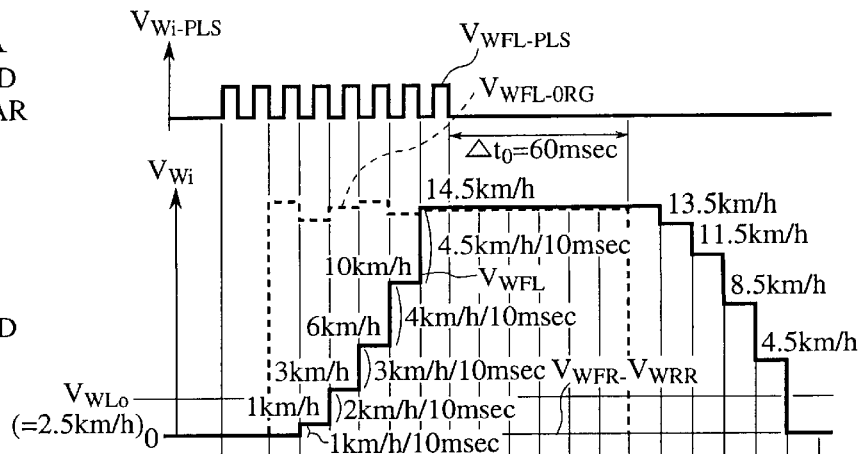
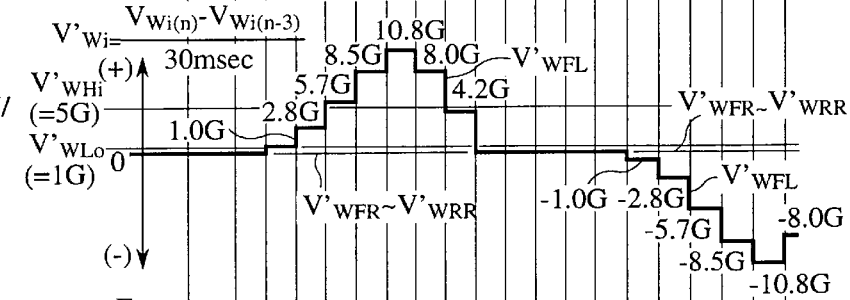
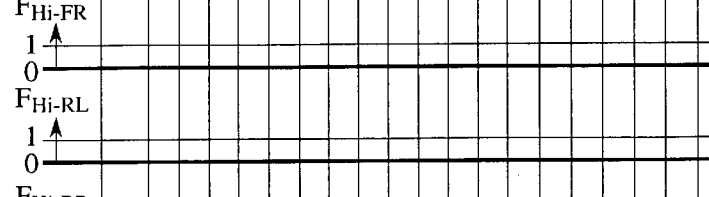
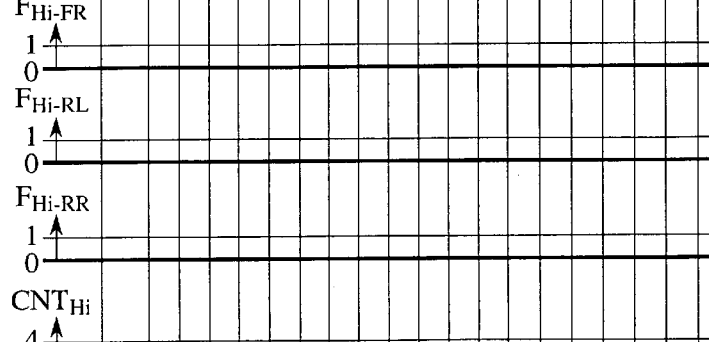
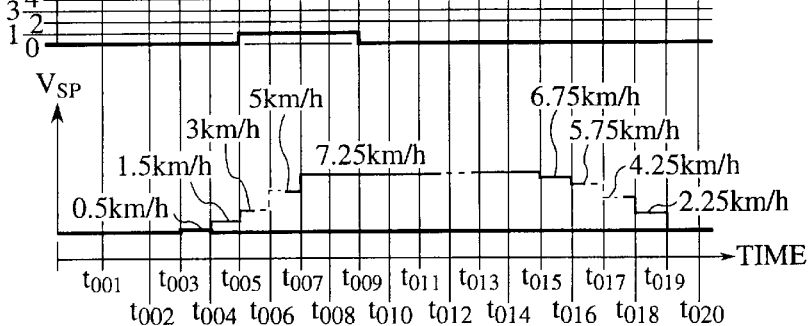

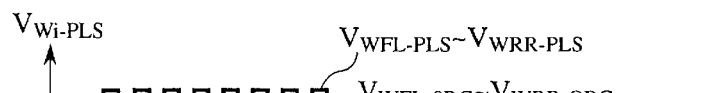
FIG. 10A
WHEEL SPEED
RECTANGULAR
PULSE
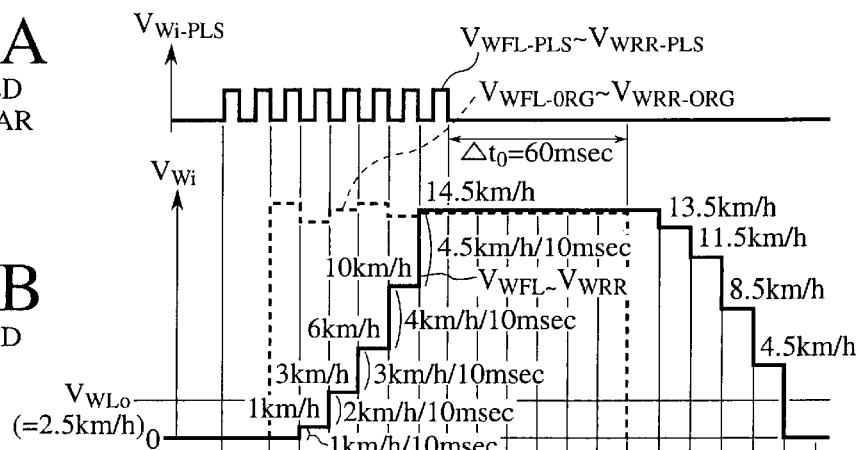
FIG. 10B
WHEEL SPEED
FIG. 10C
WHEEL
ACCELERATION/
DECELERATION
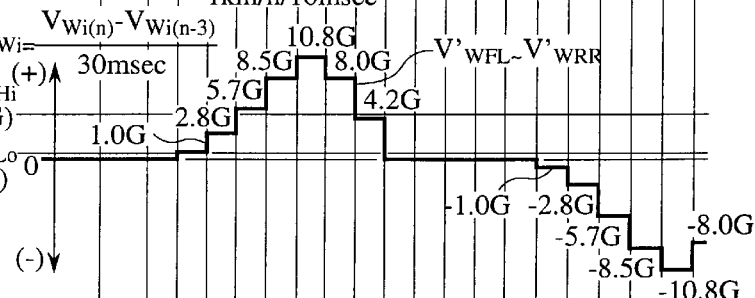
FIG. 10D
SELECT 3RD FLAG
FIG. 10E
FLAG OF
HIGH-FREQ.
NOISE WHEEL
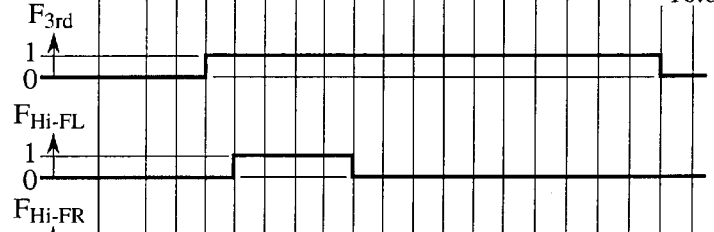
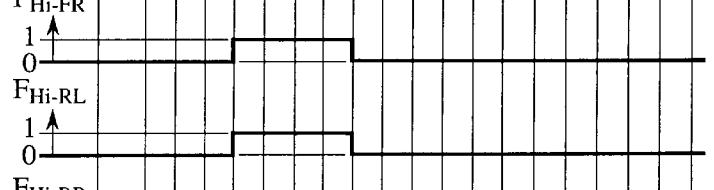
FIG. 10F
COUNTER OF
HIGH-FREQ.
NOISE WHEEL
FIG. 10G
VEHICLE
VELOCITY
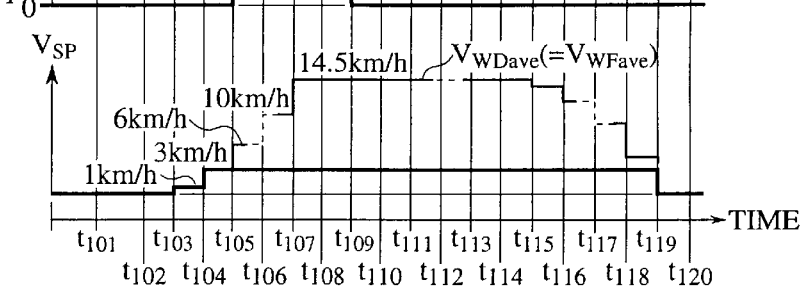

VEHICLE VELOCITY DETECTING DEVICE

BACKGROUND OF THE INVENTION

1. Field of the Invention

The present invention relates to a vehicle velocity detecting device which can detect the velocity of a vehicle and display it on e.g. an instrument panel by using values detected by wheel speed sensors arranged on respective wheels in the anti-lock brake control apparatus.

2. Description of the Related Art

In the conventional vehicle, it has been generally carried out to detect a rotating speed of an output shaft of the transmission apparatus, in other words, an average of rotating speeds of driving wheels and display it on e.g. a speed meter of the instrument panel, as "vehicle velocity".

While, the vehicle velocity detecting device disclosed in Japanese Unexamined Patent Publication (kokai) No. 9-272421 detects the vehicle velocity by processing signals generated from the rotating speed sensors arranged on respective wheels in the anti-lock brake control apparatus.

Now, although the above-mentioned conventional vehicle velocity detecting device adopts an average of driving wheels' speeds detected by the wheel rotating speed sensors of the anti-lock braking control apparatus as the vehicle velocity, the device has a problem that the wheel speeds detected by the wheel rotating speed sensors may contain undesirable noises, different from the rotating speed obtained by the rotating speed sensor detecting revolutions of the output shaft of the transmission apparatus. In detail, it is believed that the occurrence of noises originates in the vibrations of disc rotors and brake pads of the wheels, the magnetic field generated from cables embedded in the ground a road, or the like.

Consequently, under a specific condition, the vehicle velocity detecting device incorrectly detects the wheels speed which is apt to be normally larger than the actual rotating speed of the wheel.

SUMMARY OF THE INVENTION

It is therefore an object of the present invention to provide a vehicle velocity detecting device which is capable of excluding the influence of noise as possible, in detecting the vehicle velocity on employment of the wheel speeds detected by the wheel speed detecting units, such as wheel speed sensors, thereby to detect the accurate vehicle velocity.

According to the present invention, the above-mentioned object of the present invention can be accomplished by a vehicle velocity detecting device for detecting vehicle velocity of a vehicle by using respective wheel speeds of at least four wheels of the vehicle, the vehicle velocity detecting device comprising:

a wheel speed detecting unit for detecting the wheel speeds of the four wheels individually;

a noise condition detecting unit for detecting noise condition affecting the wheel speeds detected by the wheel speed detecting unit; and a vehicle velocity detecting unit for detecting the vehicle velocity corresponding to the noise condition detected by the noise condition detecting unit.

According to the invention, there is also provided a vehicle velocity detecting device for detecting vehicle velocity of a vehicle by using respective wheel speeds of at least four wheels of the vehicle, the vehicle velocity detecting device comprising:

a first means for detecting the wheel speeds of the four wheels individually;

a second means for detecting noise condition affecting the wheel speeds detected by the first means; and a third means for detecting the vehicle velocity corresponding to the noise condition detected by the second means.

The above and other features and advantages of this invention will become apparent, and the invention itself will best be understood, from a study of the following description and appended claims, with reference to the attached drawings showing some preferred embodiments of the invention.

BRIEF DESCRIPTION OF THE DRAWINGS

FIGS. 9A to 9G are a timing chart for explanation of the detecting operation of vehicle velocity of FIG. 5 in case of the occurrence of noise in one driving wheel; and FIGS. 10A to 10G are a timing chart for explanation of the detecting operation of vehicle velocity of FIG. 5 in case of the occurrence of noise in all of four wheels.

DESCRIPTION OF THE PREFERRED EMBODIMENT

Referring to the attached drawings, we now describe a vehicle velocity detecting device in accordance with an embodiment of the present invention.

Figure 1:
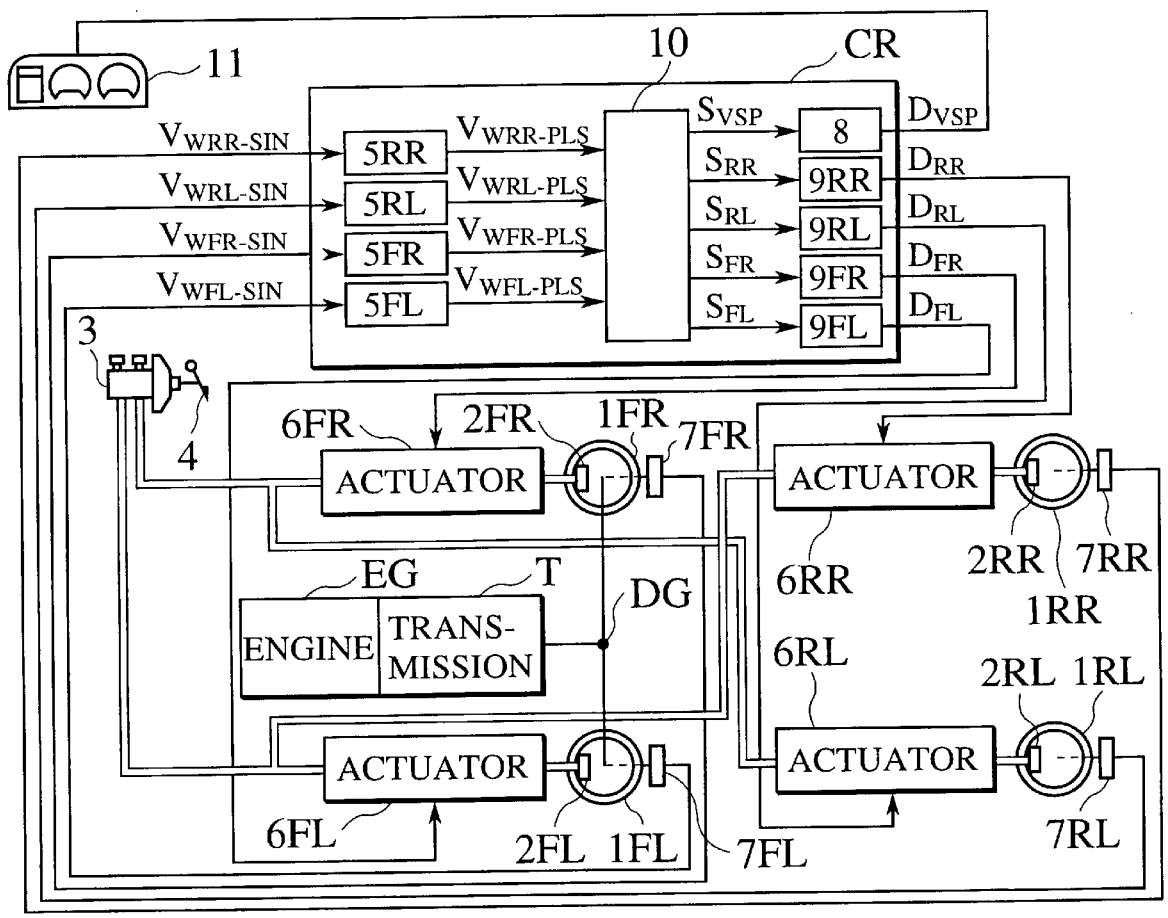
FIG. 1 is a schematic structural diagram showing one example of the application of the vehicle velocity detecting device of the invention on the anti-lock brake control apparatus.

FIG. 1 shows the constitution of the vehicle velocity detecting device applied on an anti-lock brake control apparatus of the FF (front engine and front drive) vehicle.

In the figure, reference numerals 1FL and 1FR designate left and right wheels on the front side of the vehicle and 1RL and 1RR do left and right wheels on the rear side of the vehicle, respectively. The rotational driving force originating in an engine EG is transmitted to the front wheels 1FL, 1FR through the intermediary of a transmission T and a differential gear DG furthermore. The respective wheels 1FL to 1RR have wheel cylinders 2FL to 2RR attached thereto for braking them, respectively. Further, four wheel rotating speed sensors 7FL to 7RR are attached to the wheels 1FL to 1RR respectively, for outputting sinusoidal pulses corresponding to respective wheel rotating speeds. Note, in this specification, the above wheel rotating speed will be simply referred to "wheel speed", hereinafter. This braking system using the wheel cylinders 2FL to 2RR is identical to the so-called "disc braking apparatus" where respective braking pads are to be urged against respective disc rotors of the wheels.

In the wheel cylinders 2FL to 2RR, the front and left wheel cylinder 2FL and the rear and right wheel cylinder 2RR are together connected with one line of a master cylinder 3, while the front and right wheel cylinder 2FR and the rear and left wheel cylinder 2RL are together connected with the other line of the master cylinder 3, providing the so-called diagonal split type of piping structure. Further, respectively interposed between each wheel cylinder 2FL to 2RR and the master cylinder 3 are anti-lock brake control actuators 6FL to 6RR each of which serves so as not to block the master cylinder's pressure as the original pressure. Therefore, this anti-lock brake control apparatus is constructed by a system of four sensors and four channels as a whole. Note, as occasion demands, the apparatus may be equipped with a pressure sensor for detecting the master cylinder's pressure of each line from the master cylinder 3, a brake switch which is activated when the driver steps on a brake pedal thereby to generates a brake switch signal, a lateral acceleration sensor for detecting an acceleration applied on the vehicle laterally, or the like.

As usual, each of the actuators 6FL to 6RR includes a solenoid inlet valve interposed between the master cylinder 3 and each wheel cylinder 2FL to 2RR; a series circuit consisting of a solenoid outlet valve connected parallel with the solenoid inlet valve, a pump and a check valve; and an accumulator connected between the solenoid outlet valve and the pump. Then, the operations of the solenoid inlet and outlet valves and the pumps for the respective actuators 6FL to 6RR are controlled by hydraulic control driving signals $D_{FL}, D_{FR}, D_{RL}, D_{RR}$ outputted from a control unit CR which have the wheel speeds $Vw_{FL}, Vw_{FR}, Vw_{RL}, Vw_{RR}$ inputted thereto through the wheel speed sensors 7FL to 7RR and which may have the brake switch signal inputted through the brake switch, the master cylinder's pressure detection signals from the pressure sensors and the lateral acceleration detection signal from the lateral acceleration signal, as occasion demands.

Figure 2:
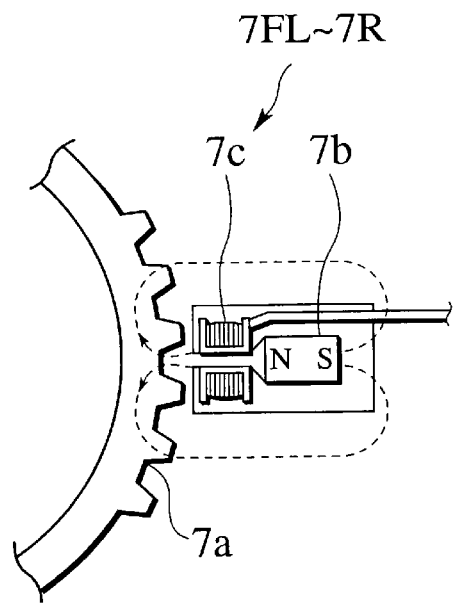
FIG. 2 is an explanatory diagram showing an example of a wheel speed sensor in FIG. 1.

Next, we describe the structure and operation of the wheel speed sensors 7FL to 7RR in brief. The wheel speed sensors 7FL to 7RR are respectively arranged in designated positions in respective hub portions bearing the wheels individually. As shown in FIG. 2, each of the sensors 7FL to 7RR comprises a rotor 7a having the designated number of serration teeth formed on the outer periphery and a coil 7c which has an opposing magnet 7b accommodated therein and detects the dielectric electromotive force due to magnetic flux generated by the magnet 7b. That is, each of the wheel speed sensors 7FL to 7RR is adapted such that an electromotive force is induced in the coil 7c, the frequency of electromotive force corresponding to the rotating velocity of the serration of the rotor 7a. In this way, the outputs of the wheel speed sensors 7FL to 7RR are represented by sinusoidal wave currents brought by the respective dielectric electromotive forces.

While, the control unit CR comprises wheel-speed input circuits 5FL to 5RR, a microcomputer 10, output circuits 9FL to 9RR for anti-lock brake control and an output circuit 8 for detecting the vehicle velocity. In the unit CR, the wheel-speed input circuits 5FL to 5RR convert wheel-speed sinusoidal pulses $Vw_{FL-SIN}, Vw_{FR-SIN}, Vw_{RL-SIN}, Vw_{RR-SIN}$ provided from the wheel speed sensors 7FL to 7RR into wheel-speed rectangular pulses $Vw_{FL-PLS}, Vw_{FR-PLS}, Vw_{RL-PLS}, Vw_{RR-PLS}$ by their own appropriate circuits, for example, the Schmitt trigger circuits. Based on these converted signals and also dynamic radii of the rotating tires of the respective wheels 1FL to 1RR, the microcomputer 10 calculates the circumferential wheel speeds $Vw_{FL}$ to $Vw_{RR}$ and further carries out the anti-lock brake control and the calculation for detecting the vehicle velocity on the basis of the resultant speeds $Vw_{FL}$ to $Vw_{RR}$ and the master cylinder's pressure, the lateral acceleration, or the like. The output circuits 9FL to 9RR for the anti-lock brake control do convert "anti-lock brake control" signals $S_{FL}$ to $S_{RR}$ from the microcomputer 10 into "anti-lock brake drive" signals $D_{FL}$ to $D_{RR}$ respectively and subsequently, the circuits 9FL to 9RR output them. Similarly, the output circuit 8 for detecting the vehicle velocity does convert a vehicle speed signal $S_{VSP}$ from the microcomputer 10 into a "velocity meter drive" signal $D_{VSP}$ and subsequently outputs it. Note, the wheel-speed input circuits 5FL to 5RR of the embodiment have the so-called "sample holding" function to maintain the respective latest values for a designated period, such as 60 msec., even if the wheel-speed sinusoidal pulses $Vw_{FL-SIN}, Vw_{FR-SIN}, Vw_{RL-SIN}, Vw_{RR-SIN}$ from the wheel speed sensors 7FL to 7RR decrease in a step manner.

Figure 3:
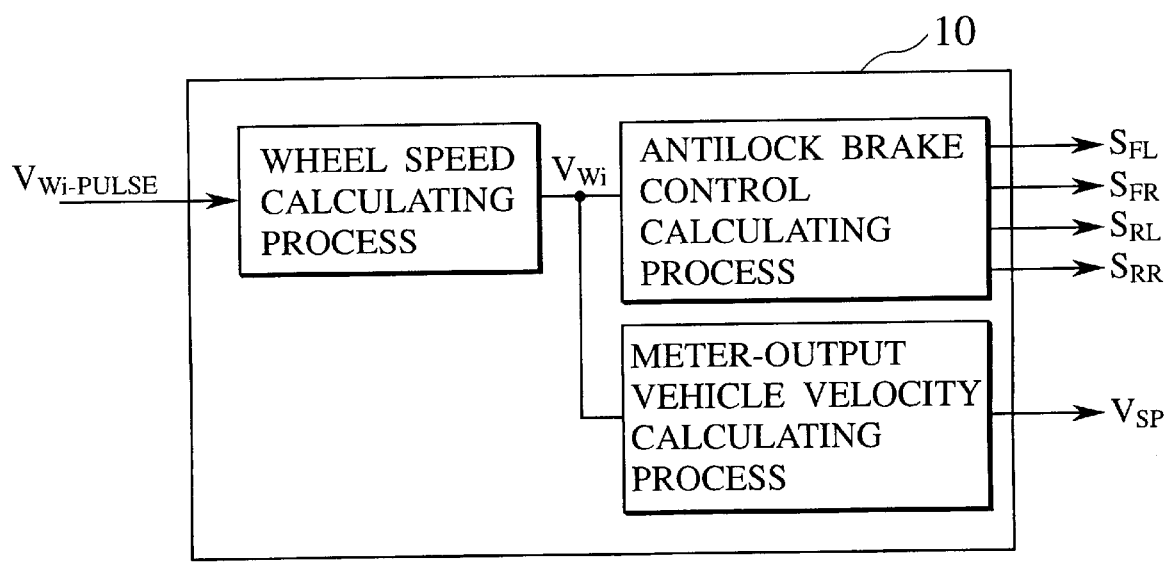
FIG. 3 is a block diagram of calculating processes executed in a microcomputer of FIG. 1.

FIG. 3 is a block diagram showing various sorts of calculations executed by the microcomputer 10. In the microcomputer 10, there are executed a wheel-speed calculating process for calculating the wheel speed $Vw_i$ (i= FL~RR) from the wheel-speed rectangular pulses $Vw_{FL-PLS}, Vw_{FR-PLS}, Vw_{RL-PLS}, Vw_{RR-PLS}$ as the result of the conversion at the wheel-speed input circuits 5FL to 5RR; an anti-lock brake control calculating process for generating the "anti-lock brake control" signals $S_{FL}$ to $S_{RR}$ to the respective actuators 6FL to 6RR in order to prevent the wheels from being locked on the basis of the calculated wheel speed $Vw_i$; and a meter output calculating process for calculating and generating the vehicle velocity signal $S_{VSP}$ to a velocity meter 11 in the instrumental panel on the basis of the calculated wheel speed $Vw_i$, similarly.

Figure 4:
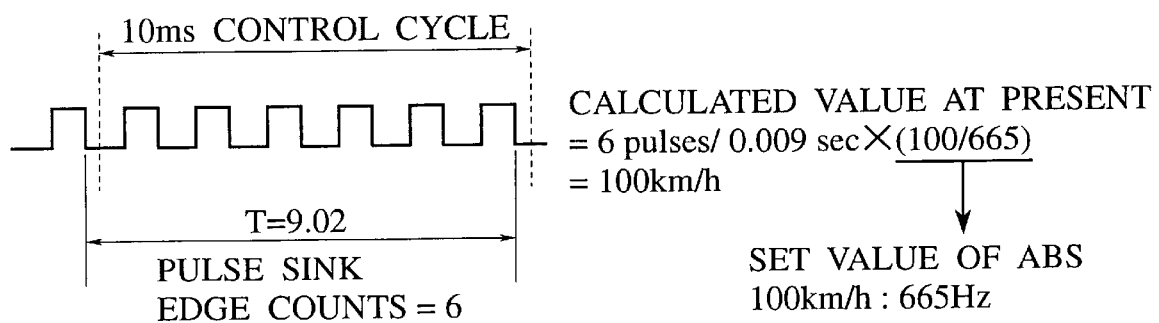
FIG. 4 is a diagram for explanation of the calculating process to calculate the wheel speed executed in the microcomputer of FIG. 1.

In the microcomputer 10, the wheel speed calculating process can be accomplished by using elements for detecting the falling of wheel-speed rectangular pulses $Vw_{i-PLS}$, for example, a comparator, a clock counter, a multiplier, a divider, etc. For example, as shown in FIG. 4, it is executed to detect the number of falling edges of the rectangular pulses $Vw_{i-PLS}$ contained in a designated control cycle and the time required. Then, by dividing the pulses number of the rectangular waves by the time required and successively multiplying the resultant quotient by the coefficient of conversion for wheel speed, the falling of wheel-speed rectangular pulses $Vw_{i-PLS}$ can be converted into each wheel speed $Vw_i$. In the shown case, it is established so as to realize the wheel speed of 100 km/h by 665 pulses of wheel-speed rectangular pulses $Vw_{i-PLS}$, in other words, the signals having a frequency of 665 Hz. For example, if six pulses are detected in the period of 9 msec., it is found that the wheel speed $Vw_i$ amounts to 100 km/h by the following expression (1):

$$6 \text{ pulses } /0.009 \text{ sec.} \times (100/665) = 100 \text{ km/h} \qquad (1)$$

Note, according to the embodiment, the wheel-speed rectangular pulses $Vw_{i-PLS}$ are converted into the wheel speed $Vw_i$ through the so-called soft filtering process where the detected wheel speed $Vw_i$ does not change sharp in spite of the occurrence of the later-mentioned noise for the wheel speed sensors, the wheels' slip, or the like. In detail, for example, when the wheel speed directly detected by the wheel-speed rectangular pulses $Vw_{i-PLS}$ is larger than a designated value, the output of the wheel speed is controlled so that, on the assumption of the control cycle of this calculation being set to 10 msec., the detected wheel speed does increase or decrease from the vehicle's traveling condition having no change in wheel speed $Vw_i$ in accordance with the order of 1 km/h/10 msec., 2 km/h/10 msec., 3 km/h/10 msec., 4 km/h/10 msec. and 4.5 km/h/10 msec. at the maximum. That is, even if the wheel-speed rectangular pulse $Vw_{i\text{-}PLS}$ abruptly increases in the step manner, the calculation is subjected to the filtering process so that the detected wheel speed $Vw_i$ gradually increases from 0 km/h to 14.5 km/h or more via 1 km/h, 3 km/h, 6 km/h, 10 km/h in order. On the contrary, even if the wheel-speed rectangular pulses $Vw_{i\text{-}PLS}$ abruptly decreases in the step manner, the filtering process is carried out so that the detected wheel speed $Vw_i$ gradually decrease from 14.5 km/h to 0 km/h via 13.5 km/h, 11.5 km/h, 8.5 km/h, 4.5 km/h in order.

Further, in the anti-lock brake control calculating process, it is executed to calculate an estimated vehicle velocity $V_{SP}$, which is closer to the actual vehicle velocity in comparison with the vehicle velocity outputted on the meter, on the basis of the wheel speeds $Vw_{FL}$ to $Vw_{RR}$ and also calculate the wheel acceleration (deceleration) $V'w_{FL}$ to $V'w_{RR}$ as the time differential values of the wheel speeds $Vw_{FL}$ to $Vw_{RR}$, and the slip ratio $S_{FL}$ to $S_{RR}$ resulting by dividing the deviation between each wheel speed $Vw_{FL}$ to $Vw_{RR}$ the estimated vehicle velocity $V_X$ by the same velocity $V_X$. Based on these factors, it is carried out to establish the mode (increase, decrease or maintain) for controlling hydraulic pressure in the wheel cylinders 2FL to 2RR of the respective wheels 1FL to 1RR and output the anti-lock brake control signals $S_{FL}$ to $S_{RR}$ against the actuators 6FL to 6RR, corresponding to the respective mode.

Note, since the operational frequency of the microcomputer 10 is extremely high, it is constructed so as to output the rectangular wave control signals of digital data having modulated pulse width, while the output circuits 8, 9FL to 9RR simply serve to convert or amplify the above signals to the drive signals suitable for the operation of the respective actuators.

Figure 5:
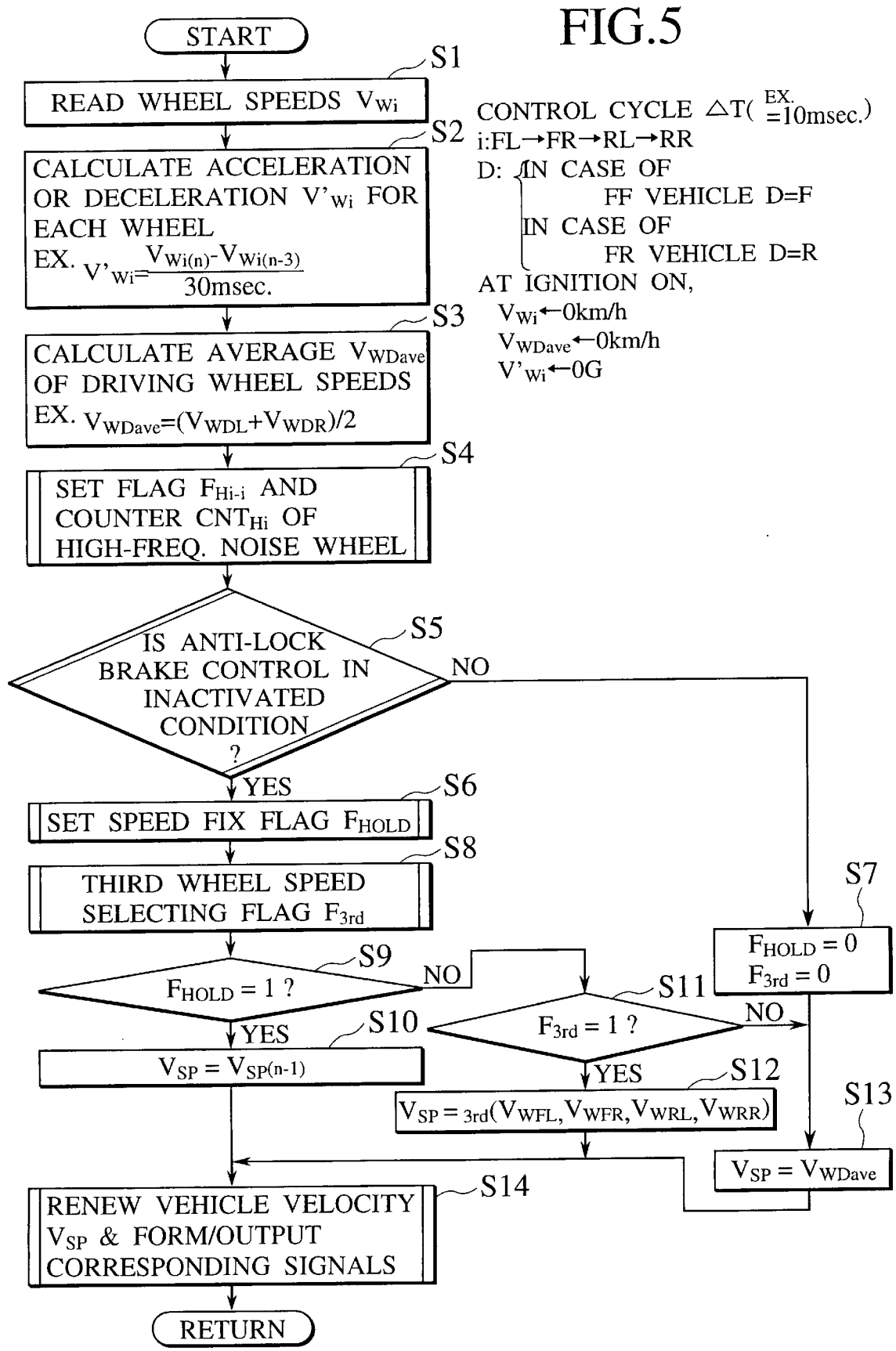
FIG. 5 is a flow chart showing the vehicle velocity calculating process executed in the microcomputer of FIG. 1, in accordance with an embodiment of the invention.

Next, we describe a calculation process to calculate the vehicle velocity for meter output executed by the microcomputer, with reference to a flow chart of FIG. 5. Note, the calculation process is executed at predetermined sampling intervals $\Delta T$ (e.g. 10 msec.) as the so-called timer interrupting process. Although the below-mentioned calculation process does not contain a communication step for the resultant vehicle velocity, a program, maps or data required for the communication may be loaded from a memory unit by a processing unit in the microcomputer and conversely, the calculated data provided by the processing unit may be renewed and stored in the memory unit, as occasion demands. Further, when the ignition switch is turned ON, all of the wheel speeds $Vw_i$ are initialized to 0 km/h, the later-mentioned average of driving wheel speeds $Vw_{Dave}$ to 0 km/h and the later-mentioned wheel acceleration/deceleration $V'w_i$ is initialized to 0 G (G: acceleration of gravity) as well.

In the calculation process, at step S1, it is executed to read the wheel speed $Vw_i$ resulting from the above wheel speed calculating process.

At next step S2, it is executed to calculate the acceleration/deceleration $V'w_i$ of each wheel in accordance with the following expression (2).

$$V'w_i = (Vw_{i(n)} - Vw_{i(n-3)})/30 \qquad (2)$$

Note, in the expression (2), it is established to obtain the acceleration/deceleration $V'w_i$ by dividing a difference between the wheel speed $Vw_{i(n)}$ calculated in the present control routine (cycle) and the same $Vw_{i(n-3)}$ calculated 30 msec. ago, in other words, three control cycles ago, by the necessary time (30 msec.).

At step S3, it is executed to calculate the average of respective wheel speeds of the wheels mainly subjected to the driving force, for example, a mean of the left and right wheels' speeds on the front side of the vehicle in this embodiment, in accordance with the following expression (3).

$$Vw_{Dave} = (Vw_{DL} + Vw_{DR})/2 \qquad (3)$$

Note: in case of a front driving vehicle: D=F
in case of a rear driving vehicle: D=R Next, at step S4, it is executed to set both flag $F_{Hi\text{-}j}$ and counter $CNT_{Hi}$ of a high-frequency noise wheel in accordance with the later-mentioned calculation of FIG. 6 and the routine goes to step S5.

At step S5, it is judged whether the anti-lock brake is presently under the uncontrolled state. If the judgement at step S5 is Yes, then the routine goes to step S6. On the contrary, when the anti-lock brake is being controlled (No), the routine goes to step S7.

Figure 7:
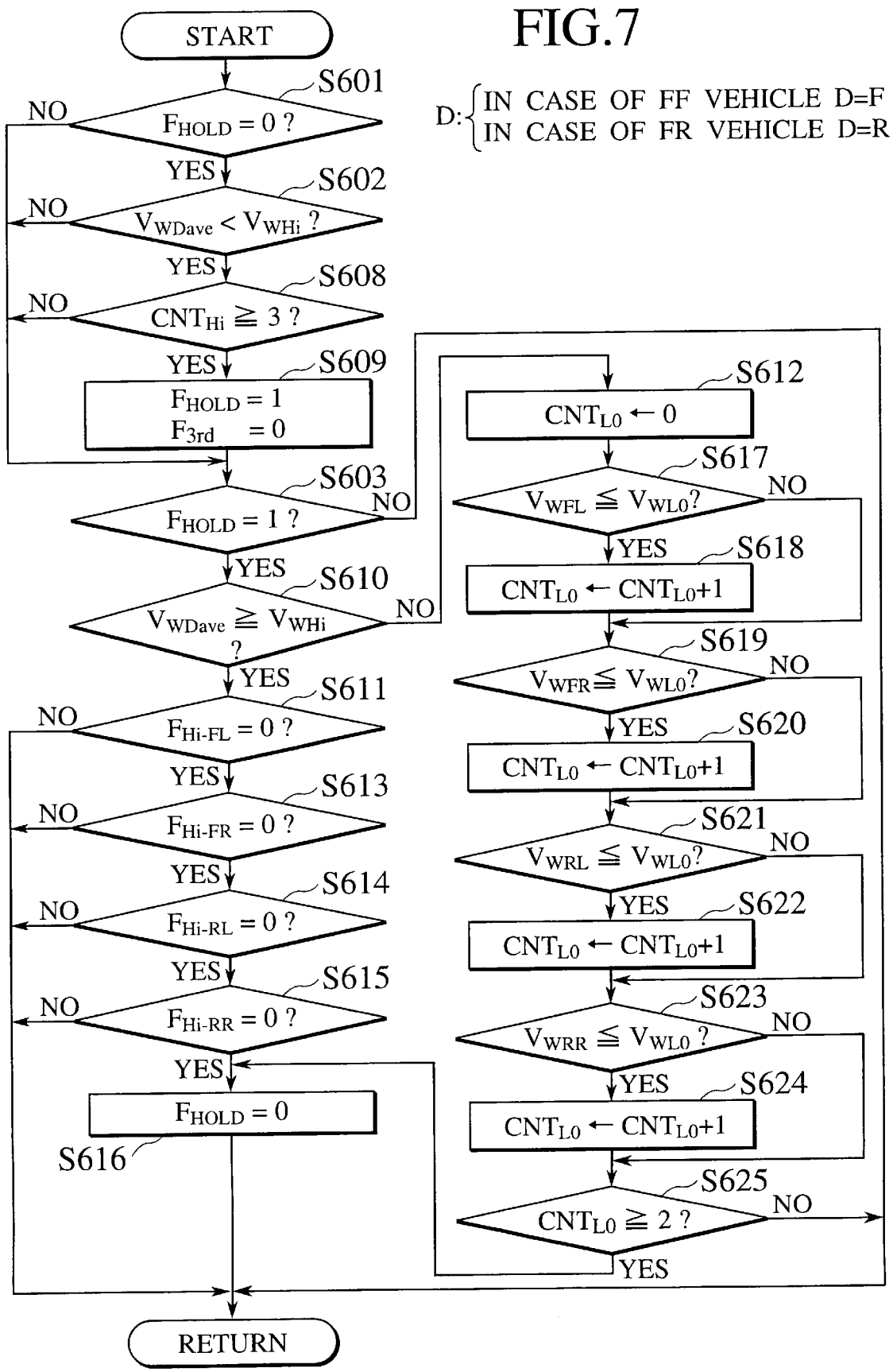
FIG. 7 is a flow chart showing the calculating process for setting vehicle velocity fixing flag of FIG. 5.

At step S6, it is carried out to set a vehicle velocity fixing flag $F_{HOLD}$ on the basis of the later-mentioned calculation of FIG. 7 and thereafter, the routine goes to step S8.

Figure 8:
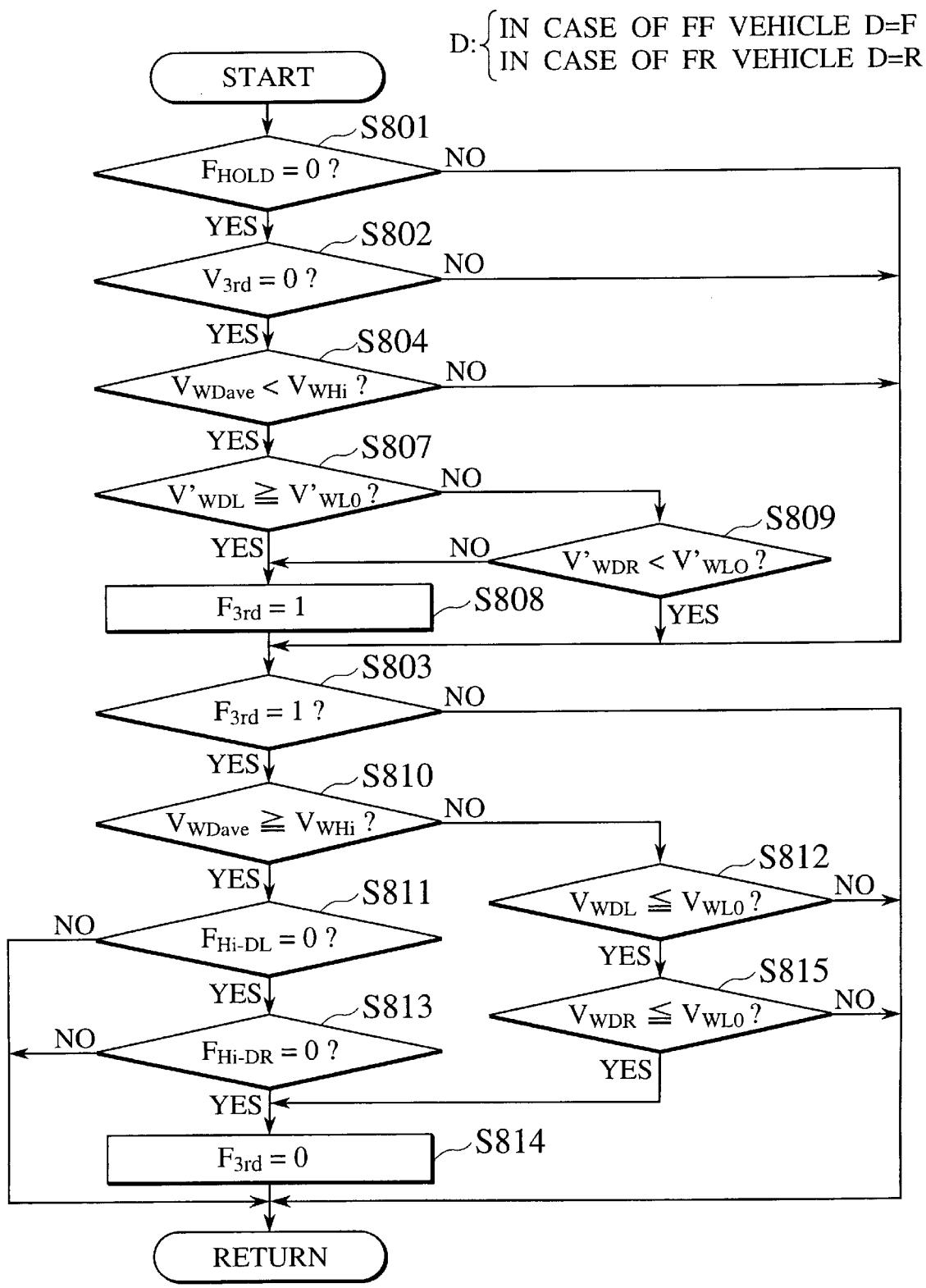
FIG. 8 is a flow chart showing the calculating process for setting third wheel speed selecting flag of FIG. 5.

At step S8, it is carried out to set a third wheel speed selecting flag $F_{3rd}$ on the basis of the later-mentioned calculation of FIG. 8 and thereafter, the routine goes to step S9.

At step S9, it is judged whether or not the vehicle velocity fixing flag $F_{HOLD}$ is set to "1". When the flag $F_{HOLD}$ is set (Yes), then the routine goes to step S10. While, if the flag $F_{HOLD}$ is not set to "1" (No), the routine goes to step S11.

Similarly, at step S11, it is judged whether or not the third wheel speed selecting flag $F_{3rd}$ is set to "1". When the flag $F_{3rd}$ is set (Yes), then the routine goes to step S12. While, if the flag $F_{3rd}$ is not set to "1" (No), the routine goes to step S13.

Again, at step S7, it is executed to together reset both vehicle velocity fixing flag $F_{HOLD}$ and third wheel speed selecting flag $F_{3rd}$ to "0" and thereafter, the routine goes to step S13.

At step S10, it is executed to replace the previously detected vehicle velocity $V_{SP(n-1)}$ with the vehicle velocity $V_{SP}$ and thereafter, the routine goes to step S14.

Further, at step S11, it is carried out to select the third wheel speed $Vw_{3rd}$ of four wheel speeds $Vw_{FL}$ to $Vw_{RR}$ from the largest one and further set the so-selected third wheel speed $Vw_{3rd}$ into the vehicle velocity $V_{SP}$ and thereafter, the routine goes to step S14.

Alternatively, at step S12, it is carried out to set the above average $Vw_{Dave}$ of the driving wheel speeds into the vehicle velocity $V_{SP}$ and thereafter, the routine goes to step S14.

At step S14, it is executed to renew the vehicle velocity $V_{SP}$ established at step S10 to S12 in accordance with not-shown individual calculations. Additionally, it is also carried out to form and output the vehicle velocity signal $S_{VSP}$ corresponding to the renewed vehicle velocity $V_{SP}$ and finally, the routine is returned to the main program.

Figure 6:
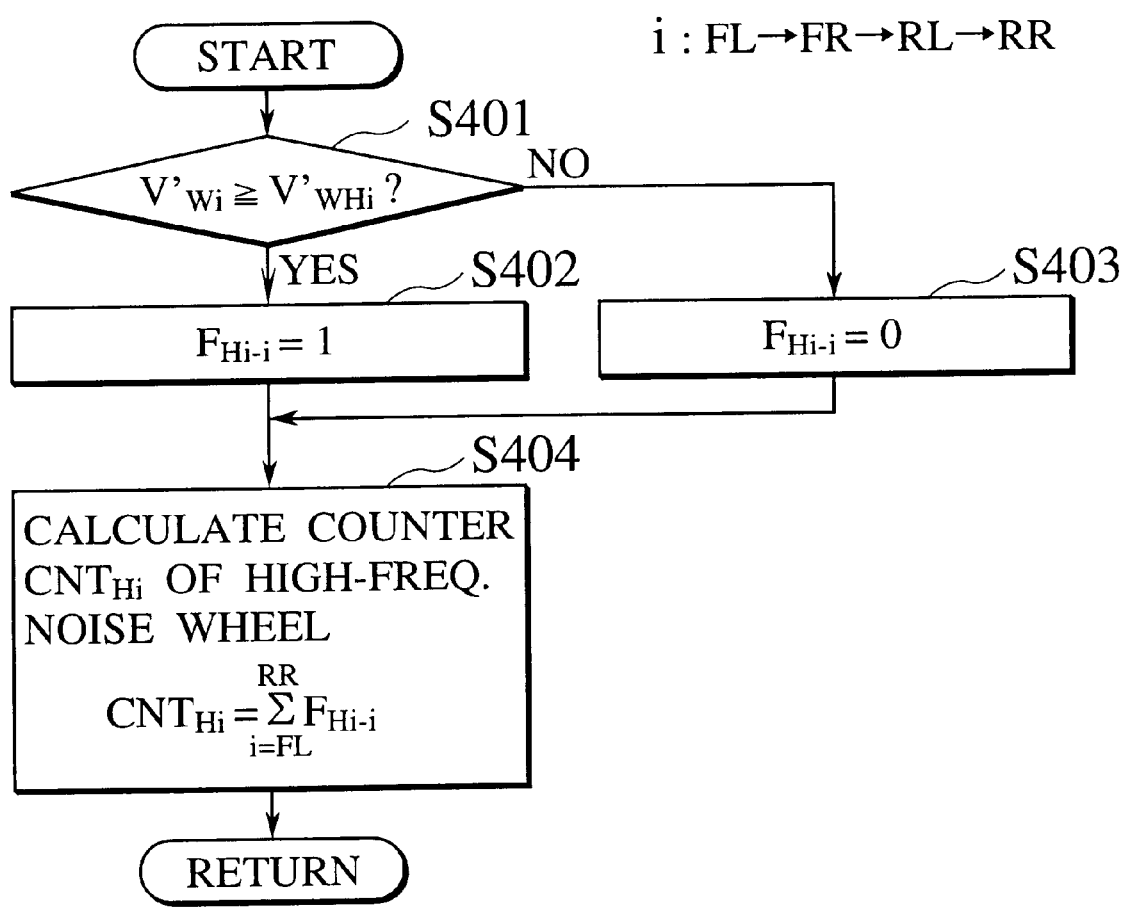
FIG. 6 is a flow chart showing the calculating process for setting flag and counter of high-frequency noise wheel of FIG. 5.

Next, we describe the calculation of FIG. 6 carried out at step S4 in the calculation of FIG. 5. In this calculation program, at step S401, it is judged whether or not the acceleration/deceleration $V'w_i$ of each wheel is more than (including equal to) a designated value $V'w_{Hi}$ (e.g. 5 G or the like) established corresponding to high-frequency noise, that is, the detected wheel speed $Vw_i$ is influenced under the high-frequency noise. Then, if the judgement is Yes ($V'w_i > V'w_{Hi}$), the routine goes to step S402. On the contrary, if not($V'w_i < V'w_{Hi}$), then the routine goes to step S403. Note, the processes at step S401 and both steps S402 and S403 mentioned later will be executed for each wheel repeatedly.

At step S402, on the assumption that the corresponding wheel speed $Vw_i$ is influenced under the high-frequency noise, it is carried out to set the high-frequency noise flag $F_{Hi-j}$ into the logical value "1" and thereafter, the routine goes to step S404.

While, at step S403, on the assumption that the corresponding wheel speed $Vw_i$ is not influenced under the high-frequency noise, it is executed to reset the high-frequency noise flag $F_{Hi-j}$ to the logical value "0" and thereafter, the routine goes to step S404.

At step 404, it is executed to represent the respective set (or reset) conditions of the high-frequency noise flags $F_{Hi-j}$ of the respective wheels by the total of the above logical values "0" and "1" and further set the resultant total value into the high-frequency noise counter $CNT_{Hi}$ and thereafter, the routine goes to step S5 of FIG. 5. In detail, if three flags $F_{Hi-j}$ of the four are together set to "1", then the high-frequency noise counter $CNT_{Hi}$ makes "3". While, if only one flag $F_{Hi-j}$ of the four is set to "1", then the high-frequency noise counter $CNT_{Hi}$ makes "1".

Next, the calculating operation executed at step S6 of FIG. 5 will be described with reference to FIG. 7. In this calculation, firstly, it is judged whether or not the vehicle velocity fixing flag $F_{HOLD}$ is reset to "0" at step S601. If the judgement at step S601 is Yes, then the routine goes to step S602. While, if the judgement at step S601 is No, the routine goes to step S603.

At step S602, it is judged whether or not the average wheel speed $Vw_{Dave}$ is less than a predetermined upper wheel speed $Vw_{Hi}$, for example, 20 km/h or the like. When the average wheel speed $Vw_{Dave}$ is less than the predetermined upper wheel speed $Vw_{Hi}$, (Yes), then the routine goes to step S608. On the contrary, if not, the routine goes to step S603.

At sequent step S608, it is judged whether or not the high-frequency noise counter $CNT_{Hi}$ is more than (including equal to) "3", in other words, there are three or more wheel speeds $Vw_i$ being influenced under the high-frequency noise. When the high-frequency noise counter $CNT_{Hi}$ is more than "3", then the routine goes to step 609. While, if the judgement at step S608 is No, then the routine goes to step S603.

At step 609, it is executed to set the vehicle velocity fixing flag $F_{HOLD}$ to "1" and also reset the third wheel speed selecting flag $F_{3rd}$ to "0" and thereafter, the routine goes to step S603.

At step S603, it is judged whether or not the vehicle velocity fixing flag $F_{HOLD}$ is set to "1". When the flag $F_{HOLD}$ is set (Yes), then the routine goes to step S610. While, if the flag $F_{HOLD}$ is reset to "0" (No), the routine goes to step S8 in the calculation of FIG. 5.

At step S610, it is judged whether or not the average drive wheel speed $Vw_{Dave}$ is more than (including equal to) the predetermined upper wheel speed $Vw_{Hi}$. When the average drive wheel speed $Vw_{Dave}$ is more than the predetermined upper wheel speed $Vw_{Hi}$, then the routine goes to step S611. While, if not, the routine goes to step S612.

At step S611, it is judged whether or not the high-frequency noise wheel flag $F_{Hi-FL}$ of the front and left wheel is reset to "0". When the flag $F_{Hi-FL}$ is reset (Yes), then the routine goes to step S613. While, if not, the routine goes to step S8 of FIG. 5.

At step S613, it is judged whether or not the high-frequency noise wheel flag $F_{Hi-FR}$ of the front and right wheel is reset to "0". When the flag $F_{Hi-FR}$ is reset (Yes), then the routine goes to step S614. While, if not, the routine goes to step S8 of FIG. 5.

At step S614, it is judged whether or not the high-frequency noise wheel flag $F_{Hi-RL}$ of the rear and left wheel is reset to "0". When the flag $F_{Hi-RL}$ is reset (Yes), then the routine goes to step S615. While, if not, the routine goes to step S8 of FIG. 5.

Similarly, at step S615, it is judged whether or not the high-frequency noise wheel flag $F_{Hi-RR}$ of the rear and right wheel is reset to "0". When the flag $F_{Hi-RR}$ is reset (Yes), then the routine goes to step S616. While, if not, the routine goes to step S8 of FIG. 5.

On the other hand, at step S612, it is executed to clear a low wheel speed counter $CNT_{LO}$ and thereafter, the routine goes to step S617.

At step S617, it is judged whether or not the front and left wheel speed $Vw_{FL}$ is less than (including equal to) a predetermined lower wheel speed $Vw_{LO}$. When the front and left wheel speed $Vw_{FL}$ is less than a predetermined lower wheel speed $Vw_{LO}$ (Yes), then the routine goes to step S618. While, if not so, the routine goes to step S619.

At step S618, the low wheel speed counter $CNT_{LO}$ is increased and thereafter, the routine goes to step S619.

At sequent step S619, it is judged whether or not the front and right wheel speed $Vw_{FR}$ is less than (including equal to) the predetermined lower wheel speed $Vw_{LO}$. If the judgement at step S619 is Yes ($Vw_{FR} < Vw_{LO}$), then the routine goes to step S620. Conversely, if not so, the routine goes to step S621.

At step S620, the low wheel speed counter $CNT_{LO}$ is again increased and thereafter, the routine goes to step S621.

At sequent step S621, it is judged whether or not the rear and left wheel speed $Vw_{RL}$ is less than (including equal to) the predetermined lower wheel speed $Vw_{LO}$. If the judgement at step S621 is Yes ($Vw_{RL} < Vw_{LO}$), then the routine goes to step S622. Conversely, if the judgement is No, the routine goes to step S623.

At step S622, the low wheel speed counter $CNT_{LO}$ is further increased and thereafter, the routine goes to step S623.

At sequent step S623, it is judged whether or not the rear and right wheel speed $Vw_{RR}$ is less than (including equal to) the predetermined lower wheel speed $Vw_{LO}$. If the judgement at step S623 is Yes ($Vw_{RR} < Vw_{LO}$), then the routine goes to step S624. Conversely, if the judgement is No, the routine goes to step S625.

At next step S624, the low wheel speed counter $CNT_{LO}$ is further increased and thereafter, the routine goes to step S625.

At sequent step S625, it is judged whether or not the low wheel speed counter $CNT_{LO}$ is more than (including equal to) "2", in other words, there are two or more wheel speeds $Vw_i$ less than the predetermined lower wheel speed $Vw_{LO}$ (e.g. 5 km/h or the like). When the counter $CNT_{LO}$ is more than "2", then the routine goes to step 616. While, if not so, then the routine goes to step S8 of FIG. 5.

At step S616, it is executed to reset the velocity fixing flag $F_{HOLD}$ to "0" and thereafter, the routine returns to step S8 in the calculation of FIG. 5.

Next, the calculating operation executed at step S8 of FIG. 5 will be described with reference to FIG. 8. In this calculation, firstly, it is judged whether or not the vehicle velocity fixing flag $F_{HOLD}$ is reset to "0" at step S801. If the judgement at step S801 is Yes, then the routine goes to step S802. While, if the judgement at step S801 is No, the routine goes to step S803.

At step S802, it is judged whether or not the third wheel speed selecting flag $F_{3rd}$ is reset to "0". When the flag $F_{3rd}$ is reset to "0" (Yes), then the routine goes to step S804. While, if the flag $F_{3rd}$ is set to "1" (No), the routine goes to step S803.

At step S804, it is judged whether or not the average drive wheel speed $Vw_{Dave}$ is less than the predetermined upper wheel speed $Vw_{Hi}$ (e.g. 20 km/h or the like). When the average drive wheel speed $Vw_{Dave}$ is less than the predetermined upper wheel speed $Vw_{Hi}$, then the routine goes to step S807. While, if not, the routine goes to step S803.

At step S807, it is judged whether the acceleration/deceleration $V'w_{DL}$ of the driving left wheel, in this case, the front and left wheel's acceleration/deceleration $V'w_{FL}$ is more than (including equal to) a designated value $V'w_{LO}$, for example, 1 G or the like, established corresponding to low-frequency noise. In other words, it is judged whether or not the detection of the left driving wheel speed $Vw_{DL}$ is influenced by the low-frequency noise. Then, if the judgement is Yes ($V'w_{DL} \geq V'w_{LO}$), the routine goes to step S808. On the contrary, if not ($V'w_{DL} < V'w_{LO}$), then the routine goes to step S809.

At next step S809, it is judged whether the acceleration/deceleration $V'w_{DL}$ of the driving right wheel, in this case, the front and right wheel's acceleration/deceleration $V'w_{FR}$ is less than the designated value $V'w_{LO}$ established corresponding to low-frequency noise. In other words, it is judged whether or not the detection of the right driving wheel speed $Vw_{DR}$ is influenced by the low-frequency noise. Then, if the judgement is Yes ($V'w_{DR} < V'w_{LO}$), the routine goes to step S803. On the contrary, if not so ($V'w_{DR} \geq V'w_{LO}$), then the routine goes to step S808.

At step S808, it is carried out to set the third wheel speed selecting flag $F_{3rd}$ is set to "1" and thereafter, the routine goes to step S803.

At step S803, it is judged whether or not the above flag $F_{3rd}$ is set to "1". When the flag $F_{3rd}$ is set (Yes), then the routine goes to step S810. While, if the flag $F_{3rd}$ is reset to "0" (No), the routine goes to step S9 in the calculation of FIG. 5.

At step S810, it is judged whether or not the average drive wheel speed $Vw_{Dave}$ is more than (including equal to) the predetermined upper wheel speed $Vw_{Hi}$. When the average drive wheel speed $Vw_{Dave}$ is more than the predetermined upper wheel speed $Vw_{Hi}$, then the routine goes to step S811. While, if not so, the routine goes to step S812.

At step S811, it is judged whether or not the high-frequency noise wheel flag $F_{Hi-DL}$ of the left driving wheel (in this case, the flag $F_{Hi-FL}$ of the front and left wheel) is reset to "0". When the flag $F_{Hi-DL}$ is reset (Yes), then the routine goes to step S813. While, if not, the routine goes to step S9 of FIG. 5.

At step S813, it is judged whether or not the high-frequency noise wheel flag $F_{Hi-DR}$ of the right driving wheel, in this case, the flag $F_{Hi-FR}$ of the front and right wheel is reset to "0". When the flag $F_{Hi-DR}$ is reset (Yes), then the routine goes to step S814. While, if not, the routine goes to step S9 of FIG. 5.

At step S812, it is judged whether or not the driving left wheel speed $Vw_{DL}$, that is, the front and left wheel speed $Vw_{FL}$ in this case, is less than (including equal to) the predetermined lower wheel speed $Vw_{LO}$ (e.g. 5 km/h or the like). When the front and left wheel speed $Vw_{DL}$ is equal to or less than the predetermined lower wheel speed $Vw_{LO}$ (Yes), then the routine goes to step S815. While, if not, the routine goes to step S9 of FIG. 5.

At sequent step S815, it is judged whether or not the driving right wheel speed $Vw_{DR}$, that is, the front and right wheel speed $Vw_{FR}$ in this case, is less than (including equal to) the predetermined lower wheel speed $Vw_{LO}$. If the judgement at step S815 is Yes ($Vw_{DR} \leq Vw_{LO}$), then the routine goes to step S814. While, if not, the routine goes to step S9 of FIG. 5.

At step S814, it is executed to reset the third wheel speed selecting flag $F_{3rd}$ to "0" and thereafter, the routine returns to step S9 in the calculation of FIG. 5.

Next, the operations of the vehicle velocity calculating processes from FIGS. 5 to 8 will be described with the timing charts of FIGS. 9 and 10. According to the calculation of the embodiment, the establishment of vehicle velocity $V_{SP}$ is changed as to whether the average of driving wheel speeds $Vw_{Dave}$ calculated at step S2 is more than (including equal to) the high designated wheel speed $Vw_{Hi}$, for example, 20 km/h or so. That is, it is noted that the noise is generated at the vehicle's traveling at an extremely low speed and the resulting vibrations between the rotor disc and the brake pad have an influence on the detected wheel speed $Vw_i$. Consequently, according to the embodiment, the wheel speed $Vw_i$ is detected as if it were approx. 15 km/h or so. Therefore, upon establishing the high designated wheel speed $Vw_{Hi}$ being somewhat larger than the above designated value, when the average of driving wheel speeds $Vw_{Dave}$ is equal to or more than the high designated wheel speed $Vw_{Hi}$, it is possible to obtain the outputs similar to those from the conventional vehicle velocity sensor for converting the rotating speed of the output shaft of the transmission since the average of driving wheel speeds $Vw_{Dave}$ is set to the vehicle velocity $V_{SP}$ in principle. By the similar reason, even when each wheel speed $Vw_i$ is less than the designated low wheel speed $Vw_{LO}$, the average of driving wheel speeds $Vw_{Dave}$ is set to the vehicle velocity $V_{SP}$ in principle. Further, during the execution of anti-lock brake control, the routine goes from step S5 to step S7 to reset the vehicle velocity fixing flag $F_{HOLD}$ to "0" and also reset the third wheel speed selecting flag $F_{3rd}$ to "0" irrespective of wheel speed and at sequent step S13, the average of driving wheel speeds $Vw_{Dave}$ is set to the vehicle velocity $V_{SP}$.

On the other hand, in the wheel speed area where the average of driving wheel speeds $Vw_{Dave}$ is less than the high designated wheel speed $Vw_{Hi}$ and each wheel speed $Vw_j$ is more than the designated low wheel speed $Vw_{LO}$, it is estimated that the detected wheel $Vw_i$ may be subjected to the influence of noise. Thus, in such a wheel speed area, the establishment condition for the vehicle velocity $V_{SP}$ is modified in accordance with the situation of noise produced.

Now, FIGS. 9A to 9G shows a situation where the wheel speed sensor 7FL for the driving front and left wheel has been subjected to the noise from the time $t_{001}$ through the time $t_{008}$ while the actual vehicle velocity is extremely slow and close to substantial zero. FIGS. 9A to 9G respectively show various changes of the wheel speed rectangular pulses $Vw_{i-PLS}$, (only shown by the front and left wheel speed rectangular pulses $Vw_{FL-PLS}$) during the same period, the wheel speed $Vw_i$, the wheel acceleration/deceleration $V'w_i$, the third wheel speed selecting flag $F_{3rd}$ ("select 3rd flag" in the figure), the high-frequency noise wheel flag $F_{Hi-j}$, the high-frequency noise wheel counter $CNT_{Hi}$ and the vehicle velocity $V_{SP}$ during the same period. Note, although the occurrence of noise is stabilized relatively, it does not always have a constant frequency but varies a little. Further, the front and left wheel speed $Vw_{FL}$ amounts to approx. 14.5 km/h or so. Within the period of the shown timing chart, the anti-lock brake control is not initiated.

In the timing chart, the front and left wheel speed rectangular pulse $Vw_{FL-PLS}$ is generated together with the occurrence of noise at time t001 and thereafter, the wheel speed is calculated when the second pulse falls at time $t_{002}$. However, since the wheel speed resulting from the above calculation is not subjected to the filtering process, it is shown with a broken line in FIG. 9B, as the original front and left wheel speed $Vw_{FL-ORG}$. Thereafter, the original front and left wheel speed $Vw_{FL-ORG}$ is calculated at respective times $t_{003}$, $t_{004}$, $t_{005}$ . . . every control cycle $\Delta T(=10$ msec.) $t_{003}$. Consequently, in spite of small fluctuations every calculating times, the original front and left wheel speed $Vw_{FL-ORG}$ is held to the numerical value of approx. 14.5 km/h or so. Although no noise is produced at time $t_{0008}$, the wheel speed $Vw_{FL-ORG}$ of approx. 14.5 km/h or so has been maintained till time $t_{014}$ owing to the sample-holding function of the designated period to (=60 msec.), that is, six control cycles. Thereafter, the wheel speed $Vw_{FL-ORG}$ is returned to 0 km/h.

On the other hand, the wheel speed $Vw_{FL}$ upon the filtering process changes 1 km/h at time $t_{003}$, 3 km/h at time $t_{004}$, 6 km/h at time $t_{005}$, 10 km/h at time $t_{006}$ due to the filtering characteristics having ±1 km/h/10 msec., ±2 km/h/10 msec., ±3 km/h/10 msec., ±4 km/h/10 msec. in order and after time $t_{007}$, the wheel speed $Vw_{FL}$ settles into 14.5 km/h due to the limit characteristics of ±4.5 km/h/10 msec. After time $t_{008}$, due to the sample holding function, the wheel speed $Vw_{FL}$ is maintained to 14.5 km/h from time $t_{009}$ till time $t_{015}$ every control cycle $\Delta T$. On and after time $t_{015}$ when the original front and left wheel speed $Vw_{FL-ORG}$ is returned to 0 km/h, it varies 13.5 km/h at time $t_{015}$, 11.5 km/h at time $t_{016}$, 8.5 km/h at time $t_{017}$, 4.5 km/h at time $t_{018}$ due to the filtering characteristics having ±1 km/h/10 msec., ±2 km/h/10 msec., ±3 km/h/10 msec., ±4 km/h/10 msec. in order and after time $t_{019}$, the wheel speed $Vw_{FL}$ is maintained to 0 km/h due to the limit characteristics of ±4.5 km/h/10 msec. The other wheel speeds, i.e., all of the front and right wheel speed $Vw_{FR}$ to the rear and right wheel speed $Vw_{RR}$ are maintained to 0 km/h.

Accordingly, as shown with a two-dot chain line in FIG. 9G, the average driving wheel speed $Vw_{Dave}$ as a mean of the front and left wheel speed $Vw_{FL}$ and the front and right wheel speed $Vw_{FR}$, which is calculated at step S3 of FIG. 5, changes 0.5 km/h at time $t_{003}$, 1.5 km/h at time $t_{004}$, 3 km/h at time $t_{005}$, 5 km/h at time $t_{006}$ in sequence and thereafter, the wheel speed $Vw_{Dave}$ is maintained to 7.25 km/h from time $t_{007}$ till time $t_{015}$. Next, the same speed $Vw_{Dave}$ again changes 6.75 km/h at time $t_{015}$, 5.75 km/h at time $t_{016}$, 4.25 km/h at time $t_{017}$, 2.25 km/h at time $t_{018}$ in sequence and 0 km/h after time $t_{019}$. On the contrary, the front and right wheel acceleration/deceleration $V'w_{FR}$ to the rear and right wheel acceleration/deceleration $V'W_{RR}$ all calculated at step S2 of FIG. 5 always have 0 km/h since all of the front and right wheel speed $Vw_{FR}$ to the rear and right wheel speed $Vw_{RR}$ have been maintained to 0 km/h. On the other hand, since the front and left wheel acceleration/deceleration $V'w_{FL}$ with respect to the front and left wheel speed $Vw_{FL}$ changing in the above way is represented by a time differential value using numeral values of three times of control cycles $\Delta T$ ago, the acceleration/deceleration $V'w_{FL}$ does change 1.0 G at time $t_{003}$, 2.8 G at time $t_{004}$, 5.7 G at time $t_{005}$, 8.5 G at time $t_{006}$, 10.8 G at time $t_{007}$, 8.0 G at time $t_{008}$, 4.2 G at time $t_{009}$ in sequence and thereafter, it is maintained to 0 G from time $t_{010}$ till time $t_{015}$. Next, the same acceleration/deceleration $V'w_{FL}$ again changes −1.0 G at time $t_{015}$, −2.8 G at time $t_{016}$, −5.7 G at time $t_{017}$, −8.5 G at time $t_{018}$, −10.8 G at time $t_{019}$ and −8.0 G at time $t_{020}$ in sequence.

As to the above-mentioned wheel speed $Vw_i$, the wheel acceleration/deceleration $V'w_i$ and the average driving wheel speed $Vw_{Dave}$, since any one of those does not change until time $t_{002}$ corresponding to the control cycle $\Delta T$, the respective control flags, i.e., the vehicle velocity fixing flag $F_{HOLD}$ and the select third flag $F_{3rd}$ are still reset to "0". Therefore, in this case, the routine goes from step S9 of FIG. 5 to step S11 and sequent step S13 where the average driving wheel speed $Vw_{Dave}$ of 0 km/h is set as the vehicle velocity $V_{SP}$.

At time $t_{003}$, although the front and left wheel acceleration/deceleration $V'w_{FL}$ is increased to 1.0 G, it is smaller than the designated highfrequency noise value $V'w_{Hi}$. Thus, in the calculation (FIG. 6) executed at step S4 of FIG. 5, the routine goes from step S401 to step S403 where the high-frequency noise flag $F_{Hi-j}$ is maintained to the logical value "0". Of course, since the other high-frequency noise flags $F_{Hi-FR}$ to $F_{Hi-RR}$ are still remained to "0", the high-frequency noise counter $CNT_{Hi}$ at step S404 still makes "0".

Also in the calculation (FIG. 7) executed at step S6 of FIG. 5, since the high-frequency noise counter $CNT_{Hi}$ makes "0" in spite that the average driving wheel speed $Vw_{Dave}$ is smaller than the designated high wheel speed $Vw_{Hi}$ (e.g. 20 km/h or so ), the routine goes from step S601 to step S608 through step S602 and sequentially, from step S608 to step S603. At step S603, since the vehicle velocity fixing flag $F_{HOLD}$ is still reset to "0", then the routine goes to step S8 of FIG. 5. In the calculation (FIG. 8) executed at step S8 of FIG. 5, since the vehicle velocity fixing flag $F_{HOLD}$ and the select third flag $F_{3rd}$ are together reset to "0" and the average driving wheel speed $Vw_{Dave}$ is smaller than the designated high wheel speed $Vw_{Hi}$, the routine goes from step S801 to step S807 via step S802 and sequent step S804. At step S807, since the front and left wheel acceleration/deceleration $V'w_{FL}$ makes 1.0 G more than the designated low-frequency noise value $V'w_{LO}$, the routine goes to step S808 where the select third flag $F_{3rd}$ is once set to the logical value "1". However, it should be noted that in process of passing through step S803, step S810 and step S812, both front and left driving wheel speed $Vw_{FL}$ and front and right driving wheel speed $Vw_{FR}$ are less than the designated low wheel speed $Vw_{LO}$ (e.g. 2.5 km/h or so). Therefore, the routine goes to step S814 through step S815, so that the select third flag $F_{3rd}$ is reset to "0". Consequently, at this time $t_{003}$, the average driving wheel speed $Vw_{Dave}$ of 0.5 km/h is set as the vehicle velocity $V_{SP}$.

At time $t_{004}$, the front and left driving wheel speed $Vw_{FL}$ does get 3 km/h more than the designated low wheel speed $Vw_{LO}$. Note, at this time, the front and left wheel acceleration/deceleration $V'w_{FL}$ makes 2.8 G, which does not exceed the designated high-frequency noise value $V'w_{Hi}$. Thus, in the calculation (FIG. 6) executed at step S4 of FIG. 5, the high-frequency noise flag $F_{Hi-j}$ is maintained to "0" and therefore, the high-frequency noise counter $CNT_{Hi}$ also makes "0". Additionally, also in the calculation (FIG. 7) executed at step S6 of FIG. 5, the vehicle velocity fixing flag $F_{HOLD}$ is still reset to "0". On the contrary, in the calculation (FIG. 8) executed at step S8 of FIG. 5, when the routine goes from step S807 to step S808 where the select third flag $F_{3rd}$ is set to the logical value "1", then the routine goes from step S812 to step S9 in the calculation of FIG. 5 where the select third flag $F_{3rd}$ is maintained to the logical value "1". Thereupon, in the calculation of FIG. 5, the execution is transferred from step S9 to step S12 via step S11, where the third wheel speed $Vw_j$ from the largest one is selected to the vehicle velocity $V_{SP}$. Hereat, since all of the wheel speeds $Vw_{FR}$ to $Vw_{RR}$ except the wheel speed $Vw_{FL}$ are equal to 0 km/h, there can be obtained the vehicle velocity $V_{SP}$ of 0 km/h at all events.

At time $t_{005}$, the front and left wheel acceleration/deceleration $V'w_{FL}$ is increased to 5.9 G which is larger than the designated high-frequency noise value $V'W_{Hi}$. Therefore, in the calculation (FIG. 6) executed at step S4 of FIG. 5, the execution about the front and left wheel acceleration/deceleration $V'w_{FL}$ is transferred from step S401 to step S402 where the front and left high-frequency noise flag $F_{Hi-FL}$ is set to the logical value "1". Consequently, the high-frequency noise counter $CNT_{Hi}$ at step S404 will make "1". In the calculation (FIG. 7) executed at step S6 of FIG. 5, however, the vehicle velocity fixing flag $F_{HOLD}$ is still remained to "0" since the high-frequency noise counter $CNT_{Hi}$ is smaller than "3". Further, in the calculation (FIG. 8) executed at step S8 of FIG. 5, since the select third flag $F_{3rd}$ is set to the logical value "1", the process execution is transferred from S802 to step S803 and subsequently transferred from S810 to step S9 in the calculation of FIG. 5 through step S812. Thus, the select third flag $F_{3rd}$ is maintained in the logical value "1", so that the vehicle velocity $V_{SP}$ becomes 0 km/h.

At respective times $t_{006}$, $t_{007}$ and $t_{008}$, the front and left wheel acceleration/deceleration $V'w_{FL}$ becomes 8.5 G, 10.8 G and 8.0 G respectively, all of which are larger than the designated high-frequency noise value $V'w_{Hi}$. Therefore, in the calculation (FIG. 6) executed at step S4 of FIG. 5, the only front and left high-frequency noise flag $F_{Hi-FL}$ is set to the logical value "1". Consequently, the high-frequency noise counter $CNT_{Hi}$ is maintained to "1". In the calculation (FIG. 7) executed at step S6 of FIG. 5, however, the vehicle velocity fixing flag $F_{HOLD}$ is still remained to "0" since the high-frequency noise counter $CNT_{Hi}$ is smaller than "3". In this period, the front and left driving wheel speeds $Vw_{FL}$ are respectively 10 km/h, 14.5 km/h and 14.5 km/h, all of which are not less than the designated low wheel speed $Vw_{LO}$ and the average driving wheel speeds $Vw_{Dave}$ are respectively 5 km/h, 7.25 km/h and 7.25 km/h, all of which are not more than the designated high wheel speed $Vw_{Hi}$. Therefore, the select third flag $F_{3rd}$ is still remained in "1", so that the final vehicle velocity $V_{SP}$ is maintained to 0 km/h.

At time $t_{009}$, the front and left wheel acceleration/deceleration $V'w_{FL}$ is decreased to 4.2 G which is smaller than the designated high-frequency noise value $V'W_{Hi}$. Therefore, in the calculation (FIG. 6) executed at step S4 of FIG. 5, the front and left high-frequency noise flag $F_{Hi-FL}$ is also reset to the logical value "0". Consequently, the high-frequency noise counter $CNT_{Hi}$ will make "0" and in the calculation (FIG. 7) executed at step S6 of FIG. 5, the vehicle velocity fixing flag $F_{HOLD}$ is still remained to "0" since the high-frequency noise counter $CNT_{Hi}$ is smaller than "3".

At sequent times corresponding to every control cycle ΔT, there is no case of the front and left wheel acceleration/deceleration $V'w_{FL}$ being larger than the designated high-frequency noise value $V'w_{Hi}$. Therefore, in the calculation (FIG. 6) executed at step S4 of FIG. 5, all of the high-frequency noise flags $F_{Hi-j}$ are maintained to the logical value "0", while the high-frequency noise counter $CNT_{Hi}$ is maintained to the logical value "0". Thus, in the calculation (FIG. 7) executed at step S6 of FIG. 5, the vehicle velocity fixing flag $F_{HOLD}$ is still remained to "0". At respective times corresponding to every control cycle ΔT from time $t_{009}$ to time $t_{019}$, the front and left driving wheel speeds $Vw_{FL}$ under the influence of noise are not less than the designated low wheel speed $Vw_{LO}$ and the average driving wheel speeds $Vw_{Dave}$ are not more than the designated high wheel speed $Vw_{Hi}$. Therefore, in the calculation (FIG. 8) executed at step S8 of FIG. 5, the select third flag $F_{3rd}$ is still remained in "1", so that the final vehicle velocity $V_{SP}$ is maintained to 0 km/h.

On and after time $t_{019}$, the front and left driving wheel speeds $Vw_{FL}$ under the influence of noise are less than the designated low wheel speed $Vw_{LO}$. Therefore, in the calculation of FIG. 8 carried out at step S8 of FIG. 5, the process execution is transferred from S812 and sequent step S815 to step S814 where the select third flag $F_{3rd}$ is reset into the logical value "0". As a result, the process execution in the calculation of FIG. 5 is transferred from S9 and sequent step S11 to step S13 where the average driving wheel speed $Vw_{Dave}$ is provided for the vehicle velocity $V_{SP}$. However, since the average driving wheel speed $Vw_{Dave}$ at that time has already been 0 km/h, the result is that the vehicle velocity $V_{SP}$ is maintained to be 0 km/h.

In this way, according to the vehicle velocity detecting device of the embodiment, despite such a condition that either one of the driving wheel speeds is being influenced by noise, it is possible to make no or little difference between the detected vehicle velocity and the actual vehicle velocity. Additionally, it is possible to shorten or eliminate such a period that the vehicle velocity involving the difference is continuously detected. Note, in the conventional vehicle velocity detecting device where an average of the driving wheel speeds is adopted as the vehicle velocity, such a condition would cause a great difference between the detected velocity and the actual velocity.

On condition it is similar to the establishment in the timing chart of FIGS. 9A to 9G, FIGS. 10A to 10G show another timing chart describing a situation that all of four wheel speed sensors 7FL to 7RR are subjected to the identical noise from time $t_{101}$ to time $t_{108}$. FIGS. 10A to 10G respectively show various changes of the wheel speed rectangular pulses $Vw_{i-PL}$ during the same period, the wheel speed $V_{wi}$, the wheel acceleration/deceleration $V'w_i$, the third wheel speed selecting flag $F_{3rd}$ ("select 3rd flag" in the figure), the high-frequency noise wheel flag $F_{Hi-j}$, the high-frequency noise wheel counter $CNT_{Hi}$ and the vehicle velocity $V_{SP}$ during the same period. Note, within the period of the shown timing chart, the anti-lock brake control is not initiated.

Also in this timing chart, the original wheel speed calculated together with the occurrence of noise after time $t_{101}$, in this case, the original front and left wheel speed $Vw_{FL-ORG}$ to the original rear and right wheel speed $Vw_{RR-ORG}$ commonly appear as shown with a broken line in FIG. 10B. That is, after time $t_{102}$ when the rising of the second pulses is detected, the original front and left wheel speed $Vw_{FL-ORG}$ to the original rear and right wheel speed $Vw_{RR-ORG}$ are calculated at respective times $t_{103}$, $t_{104}$, $t_{105}$ ... every control cycle ΔT(=10 msec.). Consequently, in spite of small fluctuations every calculating times, the original wheel speeds $Vw_{FL-ORG}$ to $Vw_{RR-ORG}$ are held to the numerical value of approx. 14.5 km/h or so. Further, when the occurrence of noise is completed, the wheel speeds $Vw_{FL-ORG}$ to $Vw_{RR-ORG}$ of approx. 14.5 km/h has been maintained till time $t_{114}$, owing to the sample-holding function of the designated period $t_0$(=60 msec.), that is, six control cycles ΔT. After time $t_{114}$, the wheel speeds $V_{wFL-ORG}$ to $Vw_{RR-ORG}$ are returned to 0 km/h.

On the other hand, the respective wheel speeds $Vw_{FL}$ to $Vw_{RR}$ upon the filtering process commonly change 1 km/h at time $t_{003}$, 3 km/h at time $t_{004}$, 6 km/h at time $t_{105}$, 10 km/h at time $t_{106}$ due to the filtering characteristics having ±1 km/h/10 msec., ±2 km/h/10 msec., ±3 km/h/10 msec., ±4 km/h/10 msec. in order and after time $t_{007}$, the wheel speeds $Vw_{FL}$ to $Vw_{RR}$ settle into 14.5 km/h due to the limit characteristics of ±4.5 km/h/10 msec. After time $t_{108}$, the wheel speeds $Vw_{FL}$ to $Vw_{RR}$ are together maintained to 14.5 km/h from time $t_{009}$ till time $t_{115}$ every control cycle ΔT. The, they do change 13.5 km/h at time $t_{115}$, 11.5 km/h at time $t_{116}$, 8.5 km/h at time $t_{117}$, 4.5 km/h at time $t_{118}$ and after time $t_{119}$, the wheel speeds $Vw_{FL}$ to $Vw_{RR}$ are maintained to 0 km/h. Additionally, the acceleration/deceleration $V'w_{FL}$ to $V'w_{RR}$ all calculated at step S2 of FIG. 5 respectively appear to be time differential values each using numeral values of three times of control cycles ΔT ago, the acceleration/deceleration $V'w_{FL}$ to $V'w_{RR}$ do change 1.0 G at time $t_{103}$, 2.8 G at time $t_{104}$, 5.7 G at time $t_{105}$, 8.5 G at time $t_{106}$, 10.8 G at time $t_{107}$, 8.0 G at time $t_{108}$, 4.2 G at time $t_{109}$ in sequence and thereafter, they are maintained to 0 G from time $t_{110}$ till time $t_{115}$. Next, the same acceleration/deceleration $V'w_{FL}$ to $V'w_{RR}$ again change −1.0 G at time $t_{115}$, −2.8 G at time $t_{116}$, −5.7 G at time $t_{117}$, −8.5 G at time $t_{118}$, −10.8 G at time $t_{119}$ and −8.0 G at time $t_{120}$ in sequence.

As shown with a two-dot chain line in FIG. 10G, the average driving wheel speed $Vw_{Dave}$ calculated at step S3 of FIG. 5 changes 1 km/h at time $t_{103}$, 3 km/h at time $t_{104}$, 6 km/h at time $t_{105}$, 10 km/h at time $t_{106}$ in sequence and thereafter, the wheel speed $Vw_{Dave}$ is maintained to 14.5 km/h from time $t_{107}$ till time $t_{115}$. Next, the same speed $Vw_{Dave}$ again changes 13.5 km/h at time $t_{115}$, 11.5 km/h at time $t_{116}$, 8.5 km/h at time $t_{117}$, 4.5 km/h at time $t_{118}$ in sequence and 0 km/h after time $t_{119}$.

As to the above-mentioned wheel speed $Vw_i$, the wheel acceleration/deceleration $V'w_i$ and the average driving wheel speed $Vw_{Dave}$, since any one of those does not change until time $t_{102}$ corresponding to the control cycle ΔT, the respective control flags, i.e., the vehicle velocity fixing flag $F_{HOLD}$ and the select third flag $F_{3rd}$ are still reset to "0". Therefore, in this case, the routine goes from step S9 of FIG. 5 and sequent step S11 to step S13 where the average driving wheel speed $Vw_{Dave}$ of 0 km/h is set as the vehicle velocity $V_{SP}$.

At time $t_{103}$, although the respective acceleration/deceleration $V'w_{FL}$ to $V'w_{RR}$ are together increased to 1.0 G, they are smaller than the designated high-frequency noise value $V'w_{Hi}$ of 5.0 G or so. Thus, in the calculation (FIG. 6) executed at step S4 of FIG. 5, the routine goes from step S401 to step S403 where the high-frequency noise flags $F_{Hi-FL}$ to $F_{Hi-RR}$ are maintained to the logical value "0", respectively. Therefore, the high-frequency noise counter $CNT_{Hi}$ at step S404 still makes "0".

Also in the calculation (FIG. 7) executed at step S6 of FIG. 5, since the high-frequency noise counter $CNT_{Hi}$ makes "0" in spite that the average driving wheel speed $Vw_{Dave}$ is smaller than the designated high wheel speed $Vw_{Hi}$(e.g. 20 km/h or so ), the routine goes from step S601 to step S608 through step S602 and sequentially, from step S608 to step S603. At step S603, since the vehicle velocity fixing flag $F_{HOLD}$ is still reset to "0", then the routine goes to step S8 of FIG. 5. In the calculation (FIG. 8) executed at step S8 of FIG. 5, since the vehicle velocity fixing flag $F_{HOLD}$ and the select third flag $F_{3rd}$ are together reset to "0" and the average driving wheel speed $Vw_{Dave}$ is smaller than the designated high wheel speed $Vw_{Hi}$, the routine goes from step S801 to step S807 via step S802 and sequent step S804. At step S807, since the front wheels acceleration/deceleration $V'w_{FL}$ and $V'w_{FR}$ make 1.0 G more than the designated low-frequency noise value $V'w_{LO}$, the routine goes to step S808 where the select third flag $F_{3rd}$ is once set to the logical value "1". However, it should be noted that in process of passing through step S803, step S810 and step S812, both front and left driving wheel speed $Vw_{FL}$ and front and right driving wheel speed $Vw_{FR}$ are less than the designated low wheel speed $Vw_{LO}$(e.g. 2.5 km/h or so). Therefore, the routine goes to step S814 through step S815, so that the select third flag $F_{3rd}$ is reset to "0". Consequently, at this time $t_{003}$, the average driving wheel speed $Vw_{Dave}$ of 0.5 km/h is set as the vehicle velocity $V_{SP}$.

At time $t_{104}$, the respective wheel speeds $Vw_{FL}$ to $Vw_{RR}$ get 3 km/h more than the designated low wheel speed $Vw_{LO}$. Note, at this time, the acceleration/deceleration $V'w_{FR}$ to $V'w_{RR}$ make 2.8 G, each of which does not exceed the designated high-frequency noise value $V'w_{Hi}$. Thus, in the calculation (FIG. 6) executed at step S4 of FIG. 5, the high-frequency noise flag $F_{Hi-j}$ is all reset to "0" and therefore, the high-frequency noise counter $CNT_{Hi}$ also makes "0". Additionally, also in the calculation (FIG. 7) executed at step S6 of FIG. 5, the vehicle velocity fixing flag $F_{HOLD}$ is still reset to "0". On the contrary, in the calculation (FIG. 8) executed at step S8 of FIG. 5, when the routine goes from step S807 to step S808 where the select third flag $F_{3rd}$ is set to the logical value "1", then the routine goes from step S812 to step S9 in the calculation of FIG. 5 where the select third flag $F_{3rd}$ is maintained to the logical value "1". Thereupon, in the calculation of FIG. 5, the execution is transferred from step S9 and sequent step S11 to step S12 where the third wheel speed $Vw_i$ from the largest one is selected to the vehicle velocity $V_{SP}$. Hereat, since all of the wheel speeds $Vw_{FL}$ to $Vw_{RR}$ are equal to 3 km/h, the vehicle velocity $V_{SP}$ of 3 km/h can be obtained at all events.

At time $t_{105}$, the respective acceleration/deceleration $V'w_{FL}$ to $V'w_{RR}$ are together increased to 5.9 G larger than the designated high-frequency noise value $V'w_{Hi}$. Therefore, in the calculation (FIG. 6) executed at step S4 of FIG. 5, the execution about the front and left wheel acceleration/deceleration $V'w_{FL}$ is transferred from step S401 to step S402 where all of the high-frequency noise flags $F_{Hi-FL}$ to $F_{Hi-RR}$ are set to the logical value "1". Consequently, the high-frequency noise counter $CNT_{Hi}$ at step S404 will make "4". Therefore, in the calculation (FIG. 7) executed at step S6 of FIG. 5, the vehicle velocity fixing flag $F_{HOLD}$ is set to "1" and the select third flag $F_{3rd}$ is forcibly reset to "0", since the high-frequency noise counter $CNT_{Hi}$ gets larger than "3". Further, since the average driving wheel speed $Vw_{Dave}$ is smaller than the designated high wheel speed $Vw_{Hi}$, the process execution is transferred from step S603 and sequent step S610 to step S612 to clear the low-frequency noise counter $CNT_{LOW}$. However, since all of the wheel speeds $Vw_{FL}$ to $Vw_{RR}$ are equal to 6 km/h and larger than the designated high wheel speed $Vw_{LO}$, steps S618, S620, S622 and S624 are jumped, so that the low-frequency noise counter $CNT_{LOW}$ is maintained to "0" and the process execution is transferred from step S625 to step S8 of FIG. 5. Further, since the select third flag $F_{3rd}$ has been forcibly reset to the logical value "0", the process execution of FIG. 8 is forcibly transferred from S801 to step S9 of FIG. 5 through step S803. Accordingly, in the calculation of FIG. 5, the process execution is transferred from step S9 to step S10 to set the previous vehicle velocity $V_{SP(n-1)}$, i.e., 3 km/h as the present vehicle velocity $V_{SP}$.

At respective times $t_{106}$, $t_{107}$ and $t_{108}$, the wheel acceleration/deceleration $V'w_{FL}$ to $V'w_{RR}$ are 8.5 G, 10.8 G and 8.0 G respectively, all of which are larger than the designated high-frequency noise value $V'w_{Hi}$. Therefore, in the calculation (FIG. 6) executed at step S4 of FIG. 5, the high-frequency noise flags $F_{Hi-FL}$ to $F_{Hi-RR}$ are set to the logical value "1". Consequently, the high-frequency noise counter $CNT_{Hi}$ is maintained to "4". According to the calculation (FIG. 7) executed at step S6 of FIG. 5, the average driving wheel speeds $Vw_{Dave}$ within this period are respectively 5 km/h, 7.25 km/h and 7.25 km/h, all of which are not more than the designated high wheel speed $Vw_{Hi}$, and the respective wheel speeds $Vw_{FL}$ to $Vw_{RR}$ are 10 km/h, 14.5 km/h and 14.5 km/h respectively, all of which are not less than the designated low wheel speed $Vw_{LO}$. Thus, the low-frequency noise counter $CNT_{Hi}$ is still remained to "0" and the vehicle velocity fixing flag $F_{HOLD}$ is still remained to "1" in the set state. In the calculation process of FIG. 8 executed at step S8 of FIG. 5, therefore, there is repeated a flow where the process execution is transferred from step S801 to step S9 of FIG. 5 through step S803. Accordingly, the vehicle velocity fixing flag $F_{HOLD}$ is kept on "1" in the set state, so that the final vehicle velocity $V_{SP}$ is maintained to 3 km/h.

At time $t_{109}$, the respective wheel acceleration/deceleration $V'w_{FL}$ to $V'w_{RR}$ are respectively decreased to 4.2 G smaller than the designated high-frequency noise value $V'w_{Hi}$. Therefore, in the calculation (FIG. 6) executed at step S4 of FIG. 5, all of the high-frequency noise wheel flag $F_{Hi-FL}$ to $F_{Hi-FL}$ are reset to the logical value "0". Consequently, the high-frequency noise counter $CNT_{Hi}$ will make "0". Further, at sequent times corresponding to every control cycle $\Delta T$, there is no case of the wheel acceleration/deceleration $V'w_{FL}$ to $V'w_{RR}$ being larger than the designated high-frequency noise value $V'w_{FL}$. Therefore, all of four high-frequency noise flags $F_{Hi-FL}$ to $F_{Hi-RR}$ are maintained to the logical value "0", while the high-frequency noise counter $CNT_{Hi}$ is also maintained to the logical value "0".

On the contrary, at respective times corresponding to every control cycle $\Delta T$ from time $t_{109}$ to time $t_{119}$, the average driving wheel speeds $Vw_{Dave}$ are smaller than the designated high wheel speed $Vw_{Hi}$ and the wheel speeds $Vw_{FL}$ to $Vw_{RR}$ are more than the designated low wheel speed $Vw_{LO}$. In the calculation (FIG. 7) executed at step S6 of FIG. 5, therefore, the low-frequency noise counter $CNT_{LO}$ is still remained to "0" and the vehicle velocity fixing flag $F_{HOLD}$ is still remained to "1" in the set state. As a result, in the calculation process of FIG. 8 executed at step S8 of FIG. 5, there is repeated a flow where the process execution is transferred from step S801 to step S9 of FIG. 5 through step S803. Accordingly, the vehicle velocity fixing flag $F_{HOLD}$ is kept on "1" in the set state, so that the final vehicle velocity $V_{SP}$ is maintained to 3 km/h.

At time $t_{019}$, the average driving wheel speeds $Vw_{Dave}$ are smaller than the designated high wheel speed $Vw_H$ and the wheel speeds $Vw_{FL}$ to $Vw_{RR}$ under the influence of noise are all less than the designated low wheel speed $Vw_{LO}$. Therefore, in the calculation of FIG. 7 carried out at step S6 of FIG. 5, the process execution is transferred from step S610 to step S612 and sequent step S617 to step S624. Thus, the low-frequency noise counter $CNT_{LO}$ at step S624 gets "4" more than "2", so that the routine goes from step S625 to step S616 where the vehicle velocity fixing flag $F_{HOLD}$ is reset to "0". Continuously, in the calculation of FIG. 8 executed at step S8 of FIG. 5, the process execution is moved from step S801 to step S803 via steps S802, S804, S807, S809 in order and sequentially shifted to step S9 of FIG. 5 since the left and right driving wheel acceleration/deceleration $V'w_{DL}$ and $V'w_{DR}$ are equal to 0 G smaller than the designated low-frequency noise value $V'w_{LO}$ despite that the average driving wheel speed $Vw_{Dave}$ is smaller than the designated high wheel speed $Vw_{Hi}$. Therefore, although the average driving wheel speed $Vw_{Dave}$ is established as the vehicle velocity $V_{SP}$ at step S13 of FIG. 5 after steps S9 and S11, then the average driving wheel speed $Vw_{Dave}$ has already been 0 km/h, so that the vehicle velocity $V_{SP}$ represents 0 km/h. Thereafter, since all of the wheel speeds $Vw_i$ are stabilized into 0 km/h, the vehicle speed $V_{SP}$ is also maintained to 0 km/h.

In this way, according to the vehicle velocity detecting device of the above-mentioned embodiment, despite such a condition that all of the driving wheel speeds are being influenced by noise, it is possible to make no or little difference between the detected vehicle velocity and the actual vehicle velocity. Additionally, it is possible to shorten or eliminate such a period that the vehicle velocity involving the difference is continuously detected. Note, in the conventional vehicle velocity detecting device where an average of the driving wheel speeds is adopted as the vehicle velocity, such a condition would cause a great difference between the detected velocity and the actual velocity.

Further, according to the embodiment, it carried out to detect the situation of noise by the respective wheel acceleration/deceleration $V'w_i$ and when either one of the acceleration/deceleration $V'w_{DL}$ and $V'w_{DR}$ of the wheels related to the vehicle's driving force is equal to or more than the designated value $V'w_{LO}$ for low-frequency noise, for example, 1 G, then the third wheel speed $Vw_{3rd}$ from the largest one is established as the vehicle speed $V_{SP}$. Therefore, it is possible to eliminate the wheel speed variations of 1 G or so, which may be caused by the vehicle's slipping movement due to the driving force, whereby the more accurate vehicle speed $V_{SP}$ can be provided.

Again, when the respective wheel acceleration/deceleration $V'w_i$ are equal to or more than the designated high-frequency noise value $V'w_{Hi}$ obviously showing the occurrence of noise (e.g. 5 G), the vehicle velocity detecting device of the invention does reset neither select third flag $F_{3rd}$ nor vehicle velocity fixing flag $F_{HOLD}$ although the average driving wheel speed $Vw_{Dave}$ exceeds the upper limit of the variation range of wheel speed caused by the occurrence of noise, that is, the designated high wheel speed $Vw_{Hi}$. Consequently, it is possible to obtain a more accurate vehicle velocity $V_{SP}$ upon eliminating the influence of noise.

From the above description, it will be understood that the wheel speed sensors 7FL to 7RR and the process at step S1 of FIG. 5 of the embodiment together constitute the wheel speed detecting unit (or first means) of the present invention. Similarly, the processes at steps S2 and S4 of FIG. 5 and the calculation of FIG. 6 constitute the noise condition detecting unit (or second means) of the invention, while the processes at steps S5 to S14 of FIG. 5 and the calculations of FIGS. 7 and 8 constitute the vehicle velocity detecting unit (or third means) of the invention. Additionally, the process at step S3 of FIG. 5 of the embodiment constitutes the average driving wheel speed detecting unit (fourth means) of the invention.

The entire contents of Japanese Patent Application P10-187332 (filed Jul. 2, 1998) is incorporated herein by reference.

Although the invention has been described above by reference to an embodiment of the invention, the invention is not limited to the embodiment described above. Modifications and variations of the embodiment described above will occur to those skilled in the art, in light of the above teachings. For example, the vehicle velocity detecting device of the invention is applicable to all type of vehicles, such as rear drive vehicles, front drive vehicles, four-wheel drive vehicles and so on. Additionally, although the microcomputer is employed as the control unit in the embodiment, it may be replaced with an assembly of electronic circuits, such as a counter, a comparator and so on.

The scope of the invention is defined with reference to the following claims.

What is claimed is:

1. A vehicle velocity detecting device for detecting vehicle velocity of a vehicle by using respective wheel speeds of at least four wheels of the vehicle, the vehicle velocity detecting device comprising:
   a wheel speed detecting unit for detecting the wheel speeds of the four wheels individually;
   a noise condition detecting unit for detecting noise condition affecting the wheel speeds detected by the wheel speed detecting unit; and
   a vehicle velocity detecting unit for detecting the vehicle velocity corresponding to the noise condition detected by the noise condition detecting unit;
   wherein the vehicle velocity detecting unit adopts the third wheel speed of the four wheel speeds from the largest wheel speed as the vehicle velocity when it is judged that the noise condition detected by the noise condition detecting unit affects either one or both of wheel speeds of two driving wheels related to driving force of the vehicle.

2. The vehicle velocity detecting device of claim 1, wherein the noise condition detecting unit operates to detect the noise condition corresponding to acceleration or deceleration in rotation of the respective wheels for the vehicle.

3. A vehicle velocity detecting device for detecting vehicle velocity of a vehicle by using respective wheel speeds of at least four wheels of the vehicle, the vehicle velocity detecting device comprising:
   a first means for detecting the wheel speeds of the four wheels individually;
   a second means for detecting noise condition affecting the wheel speeds detected by the first means; and
   a third means for detecting the vehicle velocity corresponding to the noise condition detected by the second means;
   wherein the third means adopts the third wheel speed of the four wheel speeds from the largest wheel speed as the vehicle velocity when it is judged that the noise condition detected by the second means affects either one or both of wheel speeds of two driving wheels related to driving force of the vehicle.

\* \* \* \* \*